United States Patent
Ohmi et al.

(10) Patent No.: US 6,603,786 B1
(45) Date of Patent: Aug. 5, 2003

(54) EXCIMER LASER OSCILLATION APPARATUS AND METHOD, EXCIMER LASER EXPOSURE APPARATUS, AND LASER TUBE

(75) Inventors: Tadahiro Ohmi, Sendai (JP); Nobuyoshi Tanaka, Tokyo (JP); Masaki Hirayama, Sendai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/538,284

(22) Filed: Mar. 30, 2000

Related U.S. Application Data

(62) Division of application No. 08/893,977, filed on Jul. 16, 1997, now Pat. No. 6,331,994.

(30) Foreign Application Priority Data

| Jul. 19, 1996 | (JP) | 8-208817 |
| Jul. 22, 1996 | (JP) | 8-212059 |
| Aug. 12, 1996 | (JP) | 8-212923 |
| Oct. 4, 1996 | (JP) | 8-264912 |
| Jan. 17, 1997 | (JP) | 9-006441 |
| Apr. 15, 1997 | (JP) | 9-097648 |

(51) Int. Cl.[7] .............. H01S 3/22; H01S 3/09
(52) U.S. Cl. .............. 372/57; 372/55; 372/58; 372/59; 372/90
(58) Field of Search .............. 372/57, 82, 92, 372/100, 58, 59

(56) References Cited

U.S. PATENT DOCUMENTS

| 3,402,364 A | 9/1968 | De Lang | 331/94.5 |
| 3,404,349 A | 10/1968 | Rigrod | 331/94.5 |
| 5,347,530 A | 9/1994 | Gekat et al. | |
| 5,379,317 A | * 1/1995 | Bridges et al. | 372/64 |
| 6,331,994 B1 | * 12/2001 | Ohmi et al. | 372/82 |

FOREIGN PATENT DOCUMENTS

| EP | 0 472 727 | 5/1990 |
| GB | 1128162 | 9/1968 |
| JP | 64-68984 | 3/1989 |
| JP | 2-241074 | 9/1990 |
| JP | 4-32281 | 2/1992 |
| WO | 88 07272 | 9/1988 |
| WO | 90 13160 | 11/1990 |

* cited by examiner

*Primary Examiner*—Paul Ip
*Assistant Examiner*—Armando Rodriguez
(74) *Attorney, Agent, or Firm*—Fitzpatrick, Cella, Harper & Scinto

(57) ABSTRACT

This invention relates to an excimer laser oscillation apparatus which has a laser chamber which stores a laser gas containing a gas mixture of at least one inert gas selected from the group consisting of Kr, Ar, and Ne, and $F_2$ gas, and in which an inner surface thereof has a reflection-free surface with respect to light of a desired wavelength of 248 nm, 193 nm, or 157 nm, and the uppermost surface of the inner surface consists of a fluoride, an optical resonator which is made up of a pair of reflection mirrors arranged to sandwich the laser chamber therebetween, and in which the reflectance of the reflection mirror on the output side is 90% or more and microwave introduction means, arranged on the laser chamber, for continuously exciting the laser gas in the laser chamber.

16 Claims, 26 Drawing Sheets

FIG. 2

(1) $F_2 + e^- \rightarrow F^- + F$    ELECTRICAL BONDING (2) $Kr + e^- \rightarrow Kr^* + e^-$    TWO STEP IODIZATION
$Kr^* + e^- \rightarrow Kr^+ + 2e^-$ (3) $Kr^+ + F + Ne \rightarrow KrF^* + Ne$    THREE BODY EXIMA FORMATION REACTION
$Kr + F_2 + Ne \rightarrow KrF^* + F + Ne$ (4) $KrF^* \rightarrow Kr + F + h\nu$    SPONTANEOUS EMISSION
$KrF^* + h\nu \rightarrow Kr + F + 2h\nu$    INDUCED EMISSION – LASER REACTION (5) $F + F + Ne \rightarrow F_2 + Ne$    THRE BODY RECOMBINATION (TOO LATE REACTION)

<u>ABSORPTION REACTION</u>

$F_2 + h\nu \rightarrow 2F$    PHOTODISSOCIATION
$F^- + h\nu \rightarrow F + e^-$    PHOTOSEPERATION

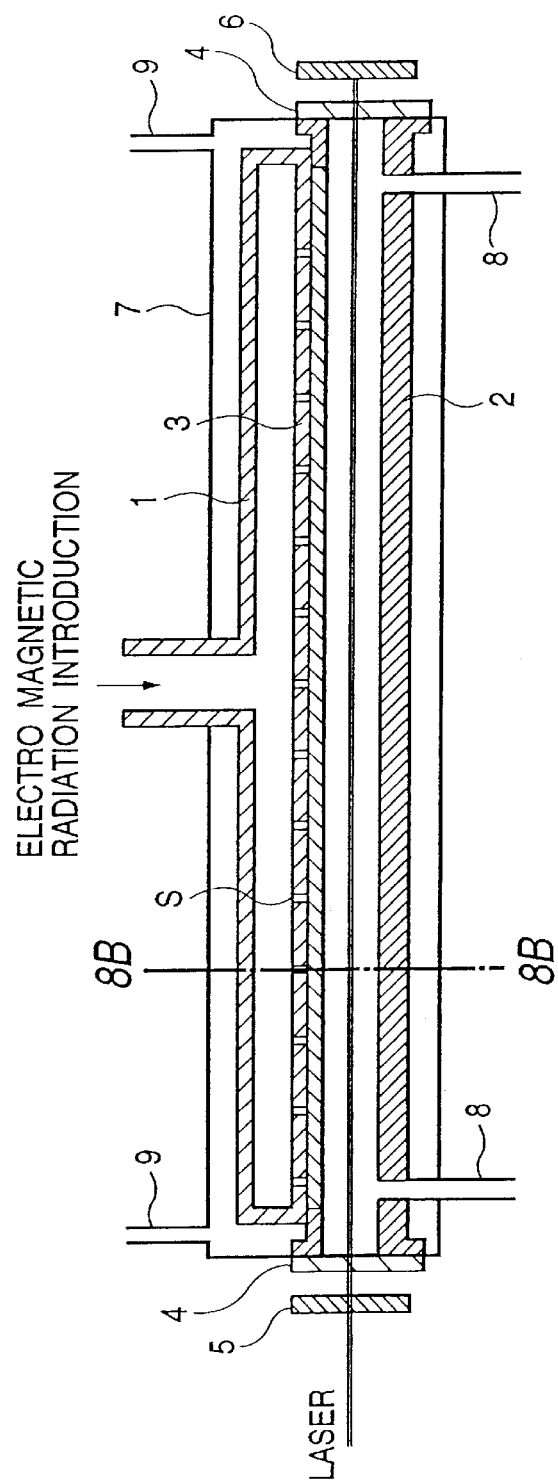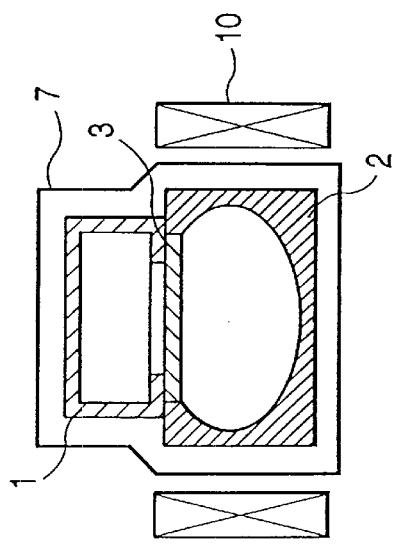

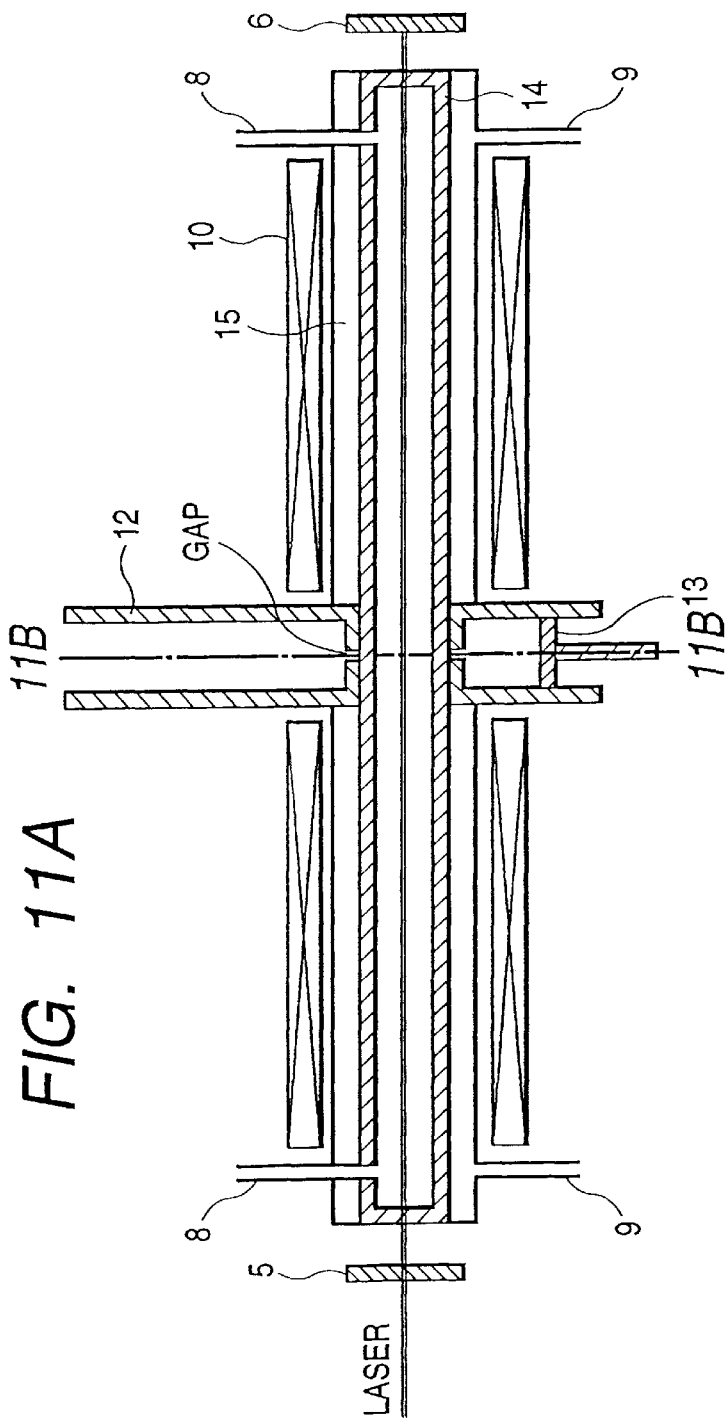
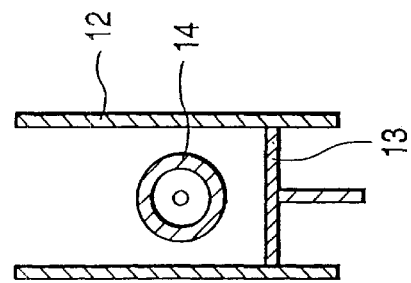
FIG. 11A
FIG. 11B $$\omega_1{}^2 = \frac{2L}{kg_1}\left[\frac{g_1 g_2}{1-g_1 g_2}\right]^{1/2}, \quad k = \frac{2\pi}{\lambda}$$

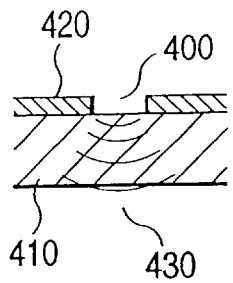
FIG. 18A
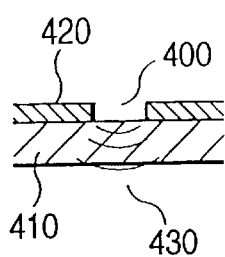
FIG. 18B
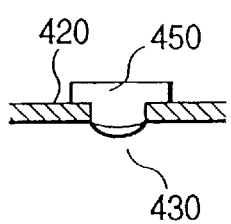
FIG. 18C
FIG. 19
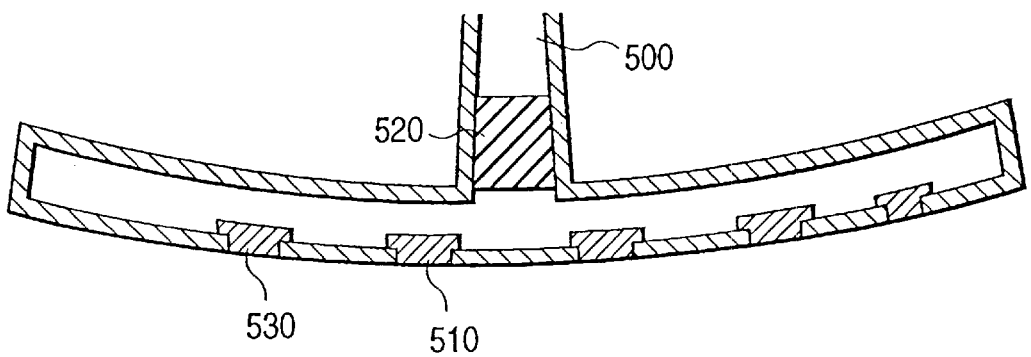
FIG. 20A
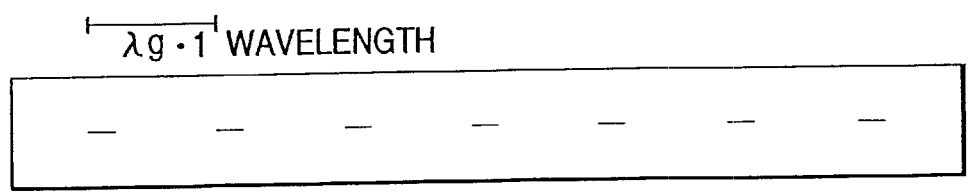
FIG. 20B

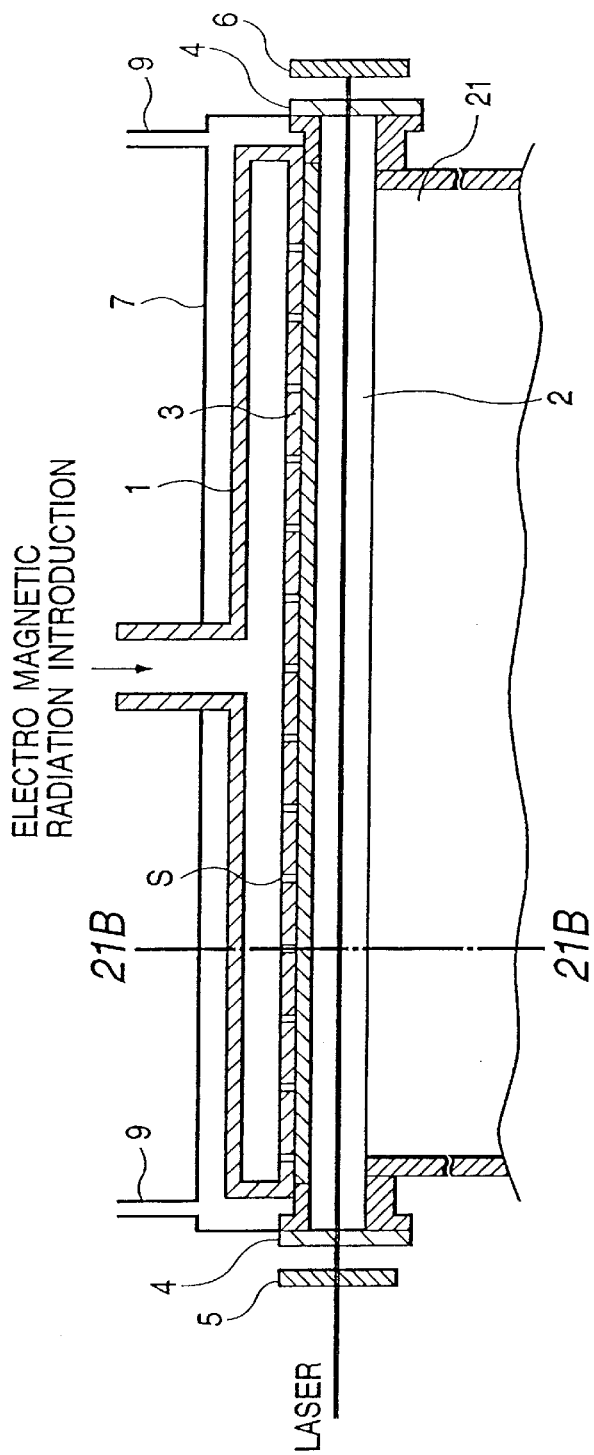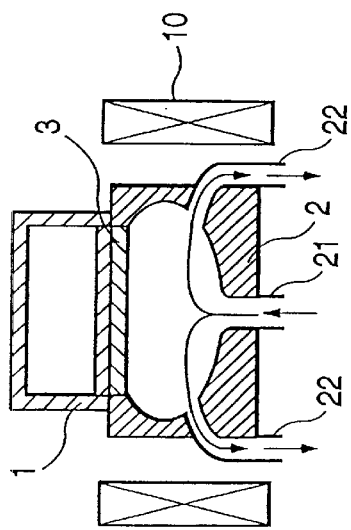
FIG. 21A
FIG. 21B

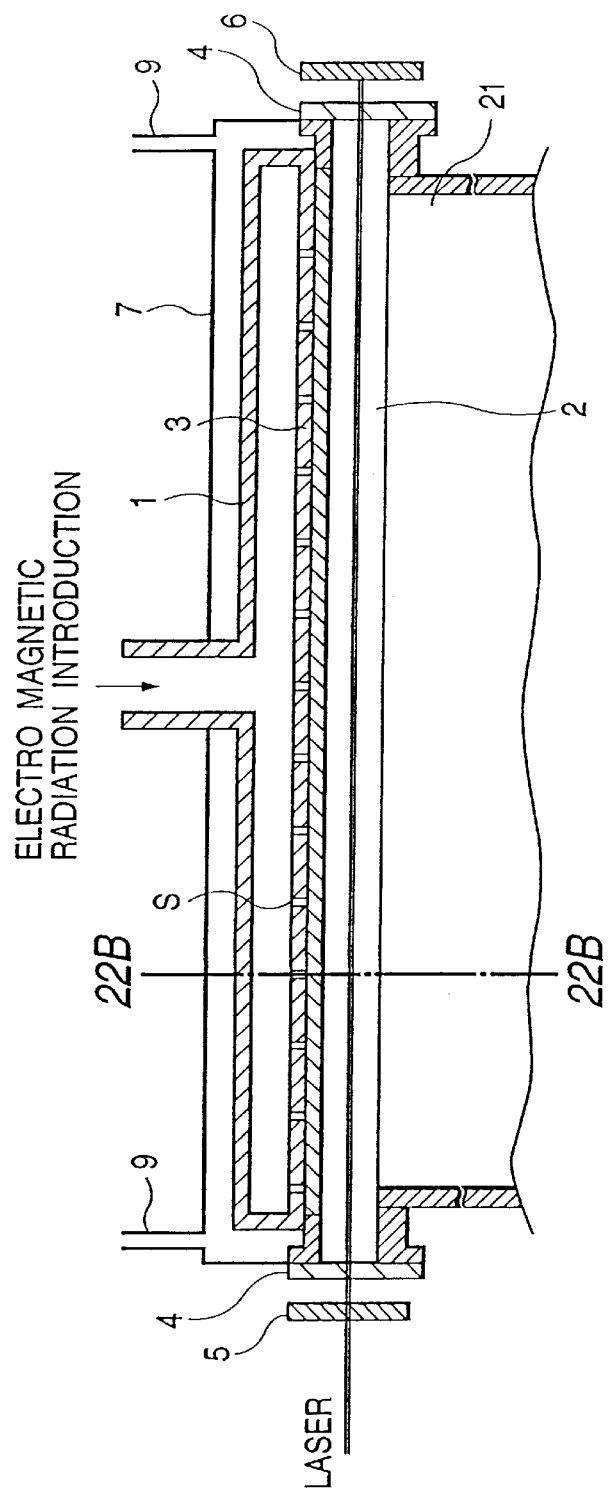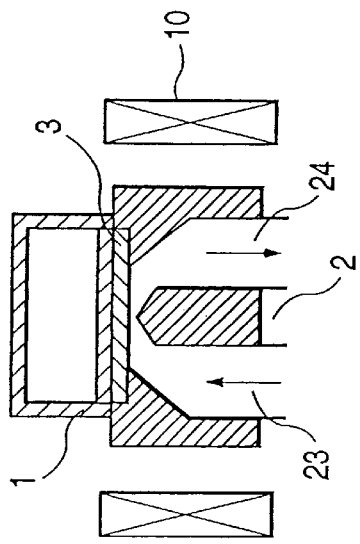

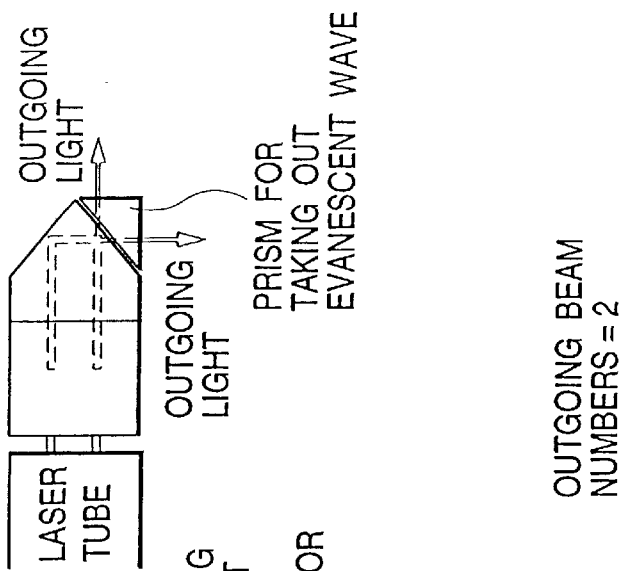
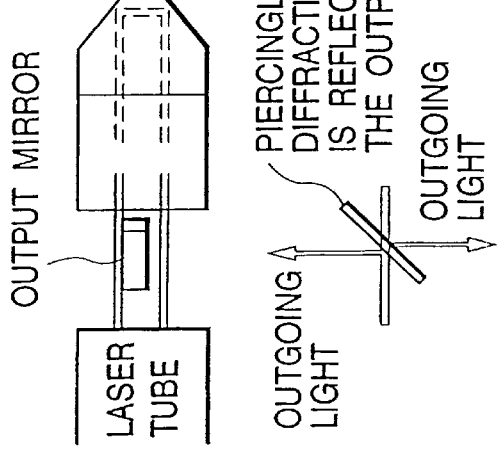
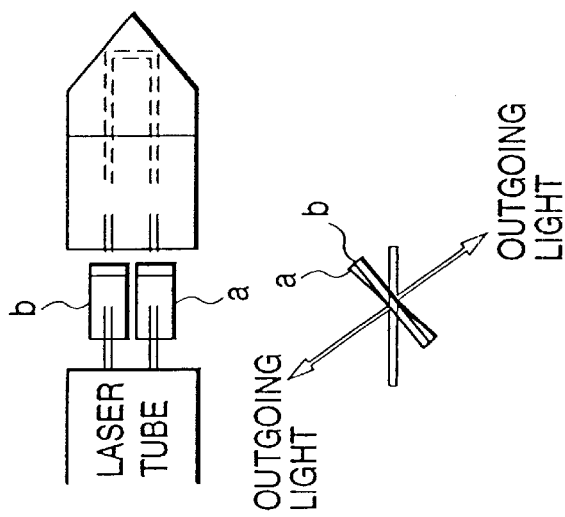

EXCIMER LASER OSCILLATION APPARATUS AND METHOD, EXCIMER LASER EXPOSURE APPARATUS, AND LASER TUBE

This is a divisional application of application Ser. No. 08/893,977, filed on Jul. 16, 1997 now U.S. Pat. No. 6,331,994.

BACKGROUND OF THE INVENTION

1. Field of the Invention

The present invention relates to a continuous emission excimer laser oscillation apparatus and method that allow continuous light emission, and an excimer laser apparatus and a laser tube.

2. Related Background Art

An excimer laser has received a lot of attention as one and only high-power laser that can oscillate in the ultraviolet region, and its applications are expected in the electronics, chemical, and energy industries.

More specifically, the excimer laser is used in working, chemical reactions, and the like of metals, resins, glass, ceramics, semiconductors, and the like.

An apparatus for generating an excimer laser beam is known as an excimer laser oscillation apparatus. A laser gas mixture containing, e.g., Ar, Kr, Ne, $F_2$, and the like filled in a manifold is excited by electron beam radiation, discharge, or the like. The excited F atoms bind to inactive $KrF^*.ArF^*$ atoms in the ground state to form molecules that can exist in only an excited state. Such molecules are called excimers. Since the excimers are unstable, they immediately emit ultraviolet rays and drop to the ground state. Such phenomenon is called bond-free transition or spontaneous emission, and an excimer laser oscillation apparatus utilizes the excited molecules and amplifies them as in-phase light in an optical resonator made up of a pair of reflection mirrors to output a laser beam.

Conventionally, it is impossible for an excimer laser oscillation apparatus to attain continuous excitation since the lifetime of excimers as a laser medium is very short, and pulse excitation that intermittently supplies fast-rise-time current pulses (about 10 nsec) is normally performed.

For this reason, the service life of electrodes in the conventional excimer laser oscillation apparatus is as short as about half a year.

On the other hand, when, for example, a chemical sensitization type resist is exposed using a pulse oscillation type continuous emission excimer laser oscillation apparatus having a repeating frequency of 100 Hz to 1 kHz in a semiconductor working process, the service life of a lens material and a reflection-free multilayered film on the surface of the lens material is very short.

Such problem will be explained in detail below.

The sensitivity of the chemical sensitization type resist is about 20 mJ/cm². Hence, light of 0.1 W/cm² requires an exposure time of 0.2 sec. On the other hand, light of 1 W/cm² requires an exposure time of 0.02 sec. In consideration of considerable losses in the optical system, an optical output of about 10 W suffices.

In pulse emission (1 kHz) used today, pulse light of about 10 nsec is generated about 1,000 times per sec. If the exposure time is 0.2 sec, 200 pulses and 20 mJ/cm² are required. Assuming that energy drops to $\frac{1}{100}$ due to losses of the optical system, the emission intensity $I_0$ of each pulse is described as follows in consideration of the pulse duty shown in FIG. 31:

$$I_0(\text{watt}) \times 10(\text{nsec}) \times 2 \times 10^2(\text{pulses}) \times 10^{-2}(\text{efficiency}) = 2 \times 10^{-2}(\text{Joul})$$

$$I_0 = 2 \times 10^{-2} / 10^{-8} \times 2$$
$$= 1 \times 10^6 \text{ (watt)}$$

If a constant optical output can be obtained for 10 nsec, pulse light of 1 MW is obtained. In practice, pulse light shown in FIG. 32 is obtained.

In practice, since the pulse light has a pulse waveform shown in FIG. 32, the intensity of light pulses has a peak power ranging from 2 to 3 MW. Since short-wavelength light of several MW intermittently are incident, the durability requirement of the lens material and the reflection-free multilayered film on its surface becomes very severe.

In the era of excimer laser lithography, step-and-repeat exposure is not simultaneously performed, but scanning exposure by scanning a mirror or lens is performed. When about 1,000 light pulses are generated per sec, and the exposure time is 0.2 sec, only about 200 pulses can be used per exposure. If, for example, a 25×35 mm² area is to be exposed uniformly, the relative relationship between the scanning mechanism of the mirror or lens and the light pulses must be very strictly controlled, and a very complicated control system is required in optical elements. In addition, at present the light pulse outputs fluctuate by about 10%. For this reason, the mirror or lens scanning control system must inevitably be made very complicated, resulting in a sophisticated, expensive excimer laser exposure apparatus.

Furthermore, the conventional excimer laser oscillation apparatus also has the following problem. That is, since a KrF laser and ArF laser of excimer lasers use highly reactive fluorine gas as a laser gas, the concentration of fluorine in the laser chamber that stores the laser gas and gives discharge energy to the gas is low. In consideration of this, the voltage supplied to the laser chamber is raised so as to obtain a predetermined output. When the predetermined output becomes hard to obtain even by such control, oscillation is interrupted, and fluorine gas is refilled. When oscillation further continues, finally the predetermined laser output cannot be obtained even by refilling fluorine, and the laser chamber must be exchanged in such state.

In the case of an excimer laser emission apparatus that emits light for about several 10 ns by discharge using voltage pulses, since the emission time is too short, the wavelength half width of the light emission spectrum of outgoing light is as wide as about 300 pm. For this reason, a wavelength half width of 1 pm or less can be obtained by monochromating using a narrow-band module such as a grating or the like.

In the existing techniques, fluorine gas must be refilled at predetermined intervals, and oscillation must be done by raising the applied voltage. In other words, fluorine gas decreases in amount due to reaction with, e.g., the chamber inner surface as time elapses. Therefore, the service life of the laser chamber is not satisfactory, and in particular, when a laser is used for a long period of time upon working articles, the service life of the chamber is an important factor upon improving the manufacturing throughput of worked articles.

A wavelength half width of 1 pm or less can be currently obtained by monochromating using a narrow-band module such as a grating or the like. However, the emission intensity of outgoing light decreases due to a narrow bandwidth using a grating or the like, and such decrease in intensity seriously disturbs improvement of the manufacturing throughput of worked articles.

SUMMARY OF THE INVENTION

It is an object of the present invention to provide a continuous emission excimer laser oscillation apparatus and method, and an exposure apparatus, which can reduce the load on the lens material and its surface, can simplify the mirror or laser scanning control system, and is satisfactorily used in mass production since the service life of an excimer laser can be sufficiently prolonged.

It is another object of the present invention to provide an excimer laser oscillation apparatus and method, which can realize a narrow bandwidth while increasing the intensity of outgoing light.

It is still another object of the present invention to provide an excimer laser exposure apparatus which can achieve a spectrum with a narrow wavelength width without using any narrow-band module, and can realize a compact, simple apparatus.

In order to achieve the above object, according to one aspect of the present invention, an excimer laser oscillation apparatus comprises:

a laser chamber which stores a laser gas containing a gas mixture of at least one inert gas selected from the group consisting of Kr, Ar, and Ne, and $F_2$ gas, and in which an inner surface thereof has a reflection-free surface with respect to light of a desired wavelength of 248 nm, 193 nm, or 157 nm, and an uppermost surface of the inner surface is made of a fluoride;

an optical resonator which is made up of a pair of reflection mirrors arranged to sandwich the laser chamber therebetween, and in which a reflectance of the reflection mirror on an output side is not less than 90%; and microwave introduction means, arranged on the laser chamber, for continuously exciting the laser gas in the laser chamber.

According to one aspect of the present invention, an excimer laser oscillation method comprises the steps of:

continuously supplying a laser gas containing a gas mixture of at least one inert gas selected from the group consisting of Kr, Ar, and Ne, and $F_2$ gas into a laser chamber in which an inner surface thereof has a reflection-free surface with respect to light of a desired wavelength of 248 nm, 193 nm, or 157 nm, and an uppermost surface of the inner surface consists of a fluoride;

continuously exciting the laser gas in the laser chamber by introducing a microwave into the laser chamber; and resonating light emitted by the excited laser gas by a pair of reflection mirrors, a reflectance of the reflection mirror on an output side being not less than 90%.

According to one aspect of the present invention, an excimer laser oscillation apparatus comprises:

a laser chamber for storing an excimer laser gas;

an optical resonator consisting of a pair of reflection mirrors arranged to sandwich the laser chamber therebetween;

light selection means, arranged in an optical path of the optical resonator, for selecting light to be oscillated;

microwave introduction means for continuously exciting the excimer laser gas; and control means for controlling the microwave introduction means to continuously introduce a microwave, and controlling the light selection means to change light to be selected when oscillation of an excimer laser is stopped.

According to one aspect of the present invention, a laser oscillation apparatus comprises:

a laser chamber for storing an excimer laser gas;

an optical resonator consisting of a pair of reflection mirrors arranged to sandwich the laser chamber therebetween; and microwave introduction means for exciting the laser gas in the laser chamber, the microwave introduction means being arranged along an optical axis of the optical resonator, and a distance between the microwave introduction means and an optical axis of the optical resonator being changed in a direction of the optical axis in accordance with changes, in the direction of the optical axis, in beam spot radius in a direction perpendicular to the optical axis.

According to one aspect of the present invention, an excimer laser oscillation apparatus comprises:

a laser chamber for storing an excimer laser gas;

an optical resonator consisting of a pair of total reflection prisms arranged to sandwich the laser chamber therebetween, light coming from the optical resonator entering the total reflection prisms at a Brewster angle; and an output member for taking out light in the optical resonator.

According to one aspect of the present invention, an An exposure apparatus comprises:

(A) an excimer laser oscillation apparatus having,
  a laser chamber which stores a laser gas containing a gas mixture of at least one inert gas selected from the group consisting of Kr, Ar, and Ne, and $F_2$ gas, and in which an inner surface thereof has a reflection-free surface with respect to light of a desired wavelength of 248 nm, 193 nm, or 157 nm, and an uppermost surface of the inner surface is made of a fluoride,
  an optical resonator which is made up of a pair of reflection mirrors arranged to sandwich the laser chamber therebetween, and in which a reflectance of the reflection mirror on an output side is not less than 90%, and
  microwave introduction means, arranged on the laser chamber, for continuously exciting the laser gas in the laser chamber;

(B) an illumination optical system for illuminating a reticle formed with a pattern by light output from the excimer laser oscillation apparatus;

(C) an imaging optical system for imaging light coming from the reticle onto a wafer; and (D) a movable stage which carries the wafer.

According to one aspect of the present invention, an exposure apparatus comprises:

(A) an excimer laser oscillation apparatus comprising:
  a laser chamber for storing an excimer laser gas,
  an optical resonator consisting of a pair of reflection mirrors arranged to sandwich the laser chamber therebetween,
  light selection means, arranged in an optical path of the optical resonator, for selecting light to be oscillated,
  microwave introduction means for continuously exciting the excimer laser gas, and
  control means for controlling the microwave introduction means to continuously introduce a microwave, and controlling the light selection means to change light to be selected when oscillation of an excimer laser is stopped;

(B) an illumination optical system for illuminating a reticle formed with a pattern by light output from the excimer laser oscillation apparatus;

(C) an imaging optical system for imaging light coming from the reticle onto a wafer; and (D) a movable stage on which the wafer is disposed and which carries the wafer.

According to one aspect of the present invention, a laser tube which stores a laser gas containing a gas mixture of at least one inert gas selected from the group consisting of Kr, Ar, and Ne, and $F_2$ gas, comprises:

a laser tube inner surface which has a reflection-free surface with respect to light of a desired wavelength of 248 nm, 193 nm, or 157 nm, and an uppermost surface of which consists of a fluoride; and an insulating plate for introducing a microwave into the laser tube.

The detailed embodiments of the present invention will become apparent from some embodiments to be described below.

BRIEF DESCRIPTION OF THE DRAWINGS

FIG. 2 shows the reaction formals of an excimer;

FIGS. 8A and 8B are respectively a cross-sectional view and an 8B—8B sectional view of an example of a continuous emission excimer laser oscillation apparatus having a microwave supply device;

FIGS. 11A and 11B are cross-sectional views of a continuous emission excimer laser oscillation apparatus having a microwave supply device;

FIGS. 18A, 18B, and 18C are schematic views showing the vicinities of a slot portion;

FIG. 19 is a sectional view showing an example of a slot waveguide;

FIGS. 20A and 20B are plan views showing an example of the slot shape;

FIGS. 21A and 21B are sectional views of an excimer laser oscillation apparatus according to an embodiment of the present invention;

FIGS. 22A and 22B are cross-sectional views of another continuous emission excimer laser oscillation apparatus having a microwave supply device;

FIGS. 25A, 25B, and 25C are side views showing modifications of FIGS. 24A and 24B;

DETAILED DESCRIPTION OF THE PREFERRED EMBODIMENTS

Figure 1:
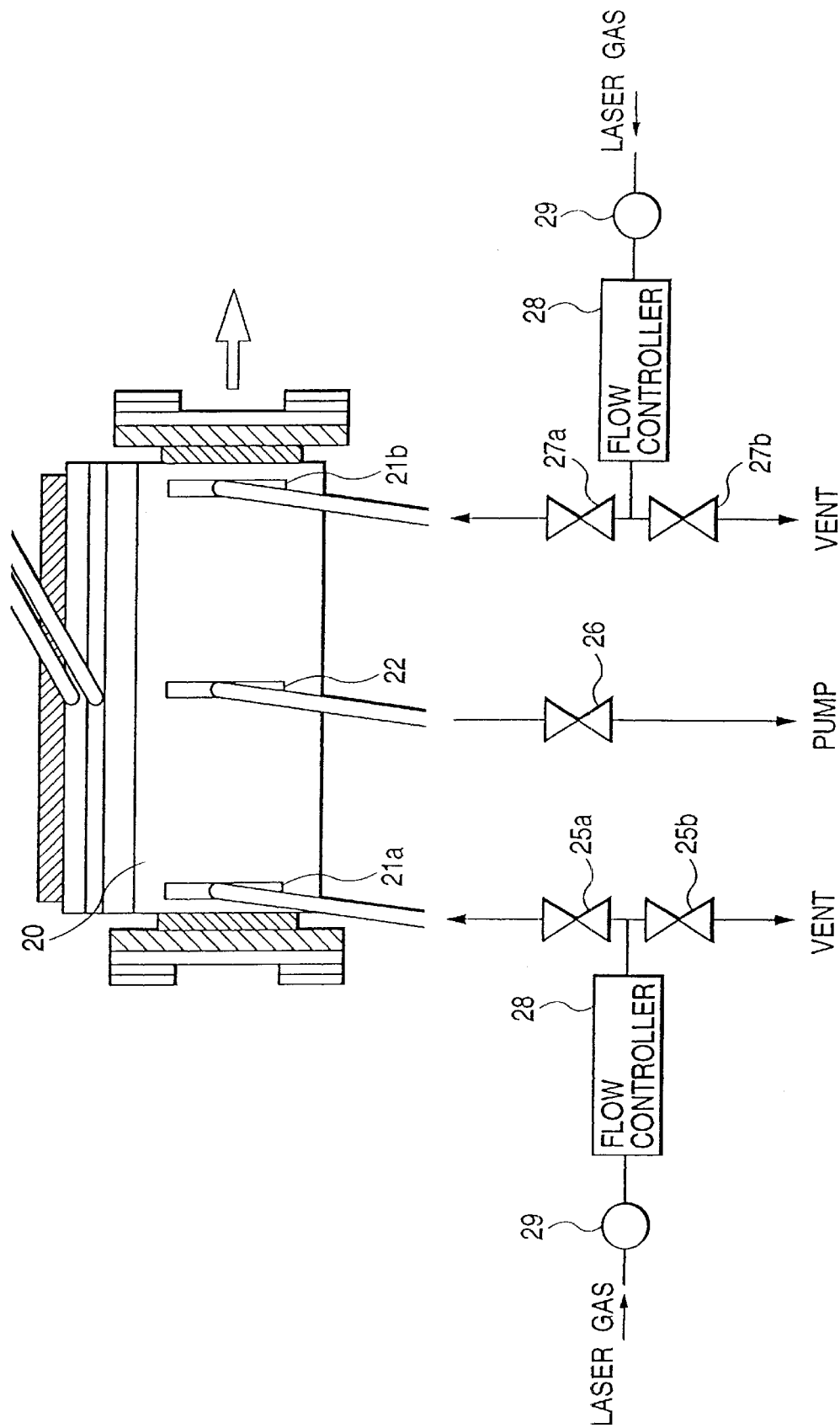
FIG. 1 is a schematic view showing a gas supply system to a laser chamber.

The effects of the present invention will be explained hereinafter together with knowledge and embodiments obtained upon achieving the invention.

In the present invention, since continuous emission is done, the need for controlling the relative relationship between the scanning mechanism of the mirror or lens and the pulses can be obviated, and the control of the optical system can be very simple.

As analyzed by the present inventors, since light of 0.1 $W/cm^2$ requires an exposure time of 0.2 sec and light of 1 $W/cm^2$ requires an exposure time of 0.02 sec, an output of about 10 W suffices in consideration of light losses in the optical system, and the service life of the lens material and its surface can be prolonged.

Furthermore, the following effects are attained.

First, damages to the optical material such as glass are reduced. A normal excimer laser such as a KrF laser, ArF laser, or the like produces pulse emissions as short as 10 to 20 nsec, while the repeating frequency of the pulse is about 1,000 Hz. Accordingly, the peak light intensity of this pulse is 10,000 times or more that obtained by continuous emission at an identical intensity regardless of the efficiency of the optical system. The major cause of damages to the material in the excimer region lies in two-photon absorption, and optical damages in the existing excimer laser which is proportional to the square of the peak intensity of light is at least $10^8$ times stricter than those in continuous emission. The durability of the glass material poses a problem in the ArF region for the above-mentioned reasons. Hence, realization of a continuous emission light source can solve material problems in the ultraviolet region as well as the ArF region.

Second, production of speckles as a phenomenon inherent to light in a narrow band can be easily suppressed. In case of pulse emission, in order to effectively remove speckles as random interference fringes, the light emission timings of the individual pulses and a known speckle removal means must be synchronized with high precision. In contrast to this, continuous oscillation does not require any special synchronization means, and speckles can be easily removed by a known, simple means such as a rotary diffusion plate. For this reason, the arrangement of the optical system can be simplified, and a cost reduction can be effectively attained.

Third, exposure amount control is easy. When discrete exposure such as pulse emission is performed, the minimum unit in exposure amount control basically depends on the number of pulses although it also depends on the controllability of the exposure amount per pulse. When exposure is attained by a total of 100 pulses, the next unit is 99 pulses or 101 pulses, and the control precision is ±1%. Of course, various means for controlling the last one pulse have been proposed, but finer exposure amount control free from any resolution owing to discreteness is preferable for controllability or control. As the line width decreases, stricter exposure amount control is required. Under such circumstances, the effect of the continuous emission light source is tremendous.

As described above, conventionally, it is impossible for an excimer laser to attain continuous emission since the energy levels in the excimer state have a short lifetime and atoms cannot be maintained at the excited level for a certain period of time and, hence, fast-rise-time pulse excitation must be performed.

In the present invention, the inner surface of a laser chamber for storing a laser gas is made up of a reflection-free surface with respect to light having desired wavelengths such as 248 nm, 193 nm, and 157 nm.

The reason why the inner surface of the laser chamber is made up of the reflection-free surface is to prevent spontaneously emitted light from being reflected by the inner surface of the laser chamber and returning to the gas to transit KrF* or ArF* from the excited state to the ground state.

Note that the reflection-free surface need not always have a 100% transmittance or absorbency but may have a certain reflectance. In this case, the reflectance is preferably 50% or less, more preferably, 20% or less, and most preferably, 5% or less. That is, the reflectance may be appropriately selected so that a uniform laser beam can be obtained upon connecting to an actual apparatus.

Furthermore, in order to prevent $F_2$ from decreasing in amount due to reaction with the laser chamber, the inner surface of the laser chamber is made up of a fluoride. In particular, the inner surface of the laser chamber is obtained by forming an $FeF_2$ layer on a stainless steel surface which is stable with respect to $F_2$, by plating nickel on a metal and forming an $NiF_2$ layer on the surface of the nickel plating layer, or by forming $AlF_3$ and $MgF_2$ layers on an aluminum alloy.

In the present invention, the reflectance of a reflection mirror on the output side is set at 90% or more.

In the arrangement of a normal resonator, a 100% reflectance is set on one side, while a reflectance of about 10% is set on the output side.

The laser gas composition of the conventional KrF* excimer laser is as follows.

Kr/Ne/$F_2$=less than 1%: 98%: less than 1%

The $F_2$ concentration is as low as 1% or less. If the $F_2$ concentration is too much, electrons are absorbed by F and become anions, resulting in unstable discharge. On the other hand, the pressure is set at 3 to 4 atm. Such pressure is set to compensate for a low $F_2$ concentration and to produce KrF* as much as possible.

An output of about 10 W suffices continuous emission. An allowable gain $\alpha_2$ will be estimated below.

Laser Beam Intensity in Resonator

Most upper-level excimers vanish by collision unless the laser operates at an intensity as high as about a saturated intensity Is. The saturated intensity is an intensity at which a gain g becomes ½ a small-signal gain $g_0$, and is obtained as follows in the case of the KrF excimer laser (Shuntaro Watabe, "Development and Applied Techniques/Examples of Excimer Laser"):

$$Is = hv/\sigma\tau$$
$$= 1.3 \text{ MW/cm}^2$$

$h$: Planck constant $6.63 \times 10^{-34}$ J·s $v$: frequency $3 \times 10^8 / 0.248 \times 10^{-6} = 1.2 \times 10^{15}$ $\sigma$: induced emission sectional area $2 \times 10^{-16}$ cm$^2$ $\tau$: upper-level lifetime 3 ns (including deexcitation due to collision)

The upper-level lifetime $\tau$ can be increased to a maximum of an emission lifetime (that in free space). The lifetime in this case is 6.7 ns, and the saturated intensity Is is:

Is=0.6 MW/cm$^2$

Laser Taking Out Efficiency

This efficiency is given by the ratio of the number of photons taken out per unit volume per second to the number of excimers produced. The laser taking out efficiency $\eta$ex is obtained by:

$$\eta\text{ex}=(I/Is)(1-(1+I/Is)-\alpha_n/g_0)$$

I: laser beam intensity

Is: saturated intensity $\alpha_n$: unsaturated absorption coefficient $g_0$: small-signal gain Since $\alpha_n>0$, the following relation holds:

$$\eta\text{ex}<(I/Is)/(1+I/Is)$$

When the laser beam intensity I is equal to or smaller than Is, laser oscillation has poor efficiency. For example, when the laser beam intensity I in the resonator is 500 W/cm$^2$, the efficiency $\eta$ex is:

$\eta$ex=1/2600 or less (the laser taking out efficiency $\eta$ex is very small).

Accordingly, in order to attain efficient laser oscillation, a saturated intensity of about 1.3 MW/cm$^2$ is required.

The preferred embodiments of the present invention will be described below.

(Laser Gas)

In the present invention, the laser gas as a laser medium consists of a gas mixture of at least one inert gas selected from the group consisting of Kr, Ar, and Ne, and $F_2$ gas.

Of these gases, different gases can be appropriately combined in correspondence with the wavelength to be used. For example, when the wavelength is 248 nm, a combination of Kr/Ne/F$_2$ is used; when 193 nm, Ar/Ne/F$_2$; when 157 nm, Ne/F$_2$.

In the present invention, it is preferable to continuously supply the laser gas into the laser chamber. FIG. 1 shows an example of the laser gas supply system that can attain such gas supply.

In FIG. 1, gas inlet ports 21a and 21b are formed at both ends of a laser chamber 20, and a gas outlet port 22 is formed at substantially the center of the laser chamber 20. Note that the gas outlet port may be connected to a vacuum pump or the like as needed. The laser gas is supplied from the gas inlet ports 21a and 21b at both ends at equal flow rates, and is exhausted from the gas outlet port 22 formed at substantially the center of the chamber. This is because such port layout also serves to protect the surface of a light reflection plate on the output end. More specifically, since the uppermost surface of the light reflection plate is coated with a thin film of, e.g., a fluoride film, it never reacts with F$_2$ and F*. On the other hand, the gas inlet ports 21a and 21b, and the gas outlet port 22 preferably have a slit-like shape in the direction microwave currents flow.

Also, in FIG. 1, valves 25a, 25b, 26, 27a, and 27b are respectively connected to the ports 21a, 21b, and 22. When the laser gas is initially supplied, the valves 25a and 27a are closed and the valves 25b and 27b are opened to purge the interior of pipes from laser gas sources to the vicinities of the valves 25a and 27a. After pipe purging, the valves 25a and 27b are closed, and the valve 26 is opened to supply the laser gas into the laser chamber 20. Once the interior of the laser chamber 20 is purged, the laser gas continues to be supplied to start laser oscillation. Of course, if purging or the like is not required, the valves need not be arranged. In FIG. 1, mass flow controllers (MFCs) or pressure flow controllers (PFCs) 28 control the flow rates. In the present invention, the PFCs are preferable. Filters 29 are connected to the PFCs 28.

In the present invention, to obtain stable continuous oscillation, the F$_2$ concentration in the laser gas falls within the range from 0.1 atomic % to 6 atomic %, and preferably falls within the range from 1 to 6 atomic %. More preferably, the F$_2$ concentration falls within the range from 4 to 6 atomic %.

The laser gas pressure preferably falls within the range from 10 Torr to 1 atm, and more preferably, 50 Torr to 1 atm. That is, in the present invention, stable discharge can be obtained even at such low pressure, and stable continuous oscillation and continuous emission can be obtained. In the conventional art, the laser gas pressure falls within the range from 3 to 4 atm. In the conventional art, when the F$_2$ concentration is raised, since F$_2$ becomes F$^-$ and electrons vanish to result in unstable discharge, the F$_2$ concentration must be inevitably set at 1% or less (still lower than that in practice), and the pressure must be inevitably set at 3 to 4 atm to compensate for such low concentration. However, in the present invention, stable discharge is obtained by microwaves even when the F$_2$ concentration is raised and, hence, the gas pressure need not be increased to compensate for the low F$_2$ concentration. Of course, the pressure may be increased if it need be increased for some reason.

FIG. 2 shows reaction formulas and reactions that take place in a laser tube of a KrF excimer laser. In FIG. 2, reaction (3) should be noted. As can be seen from (3), F$^-$ and F$_2$ are required to produce KrF* excimers. On the other hand, as can be seen from (4), excimers that have emitted light dissociate into rare gas atoms (Kr) and halogen atoms (F) in the ground state but never become F$_2$ or F$^-$ directly required for KrF* excimer production.

In addition, reaction (5) in which halogen atoms (F) produce halogen molecules (F$_2$) is very slow.

From the above findings, it is important to substitute halogen atoms that have emitted light in a discharge space and have returned to the ground state with halogen ions (F$^-$) and halogen molecules (F$_2$).

(Laser Tube)

A laser tube 40 (FIGS. 3A, 3B, and 3C and FIGS. 4A and 4B) is a tube that makes up the laser chamber, and has a window portion 44 for introducing microwaves. The laser tube 40 is connected to a waveguide 42 at its window portion 44 side. The interior of the laser tube 40 and that of the waveguide 42 are sealed, and the seal is provided by arranging an insulating plate 41 on the window portion 44 of the laser tube 40. The insulating plate 41 will be described later.

Figure 3A:
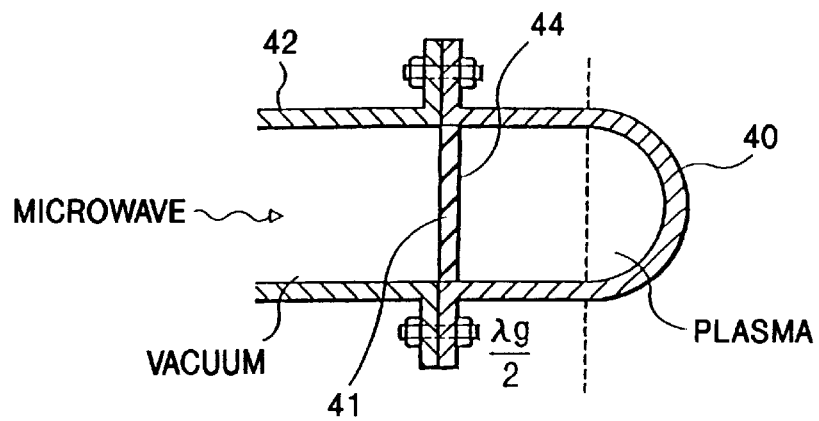
FIGS. 3A, 3B, and 3C are sectional views showing examples of the shapes of a laser tube.
Figure 3B:
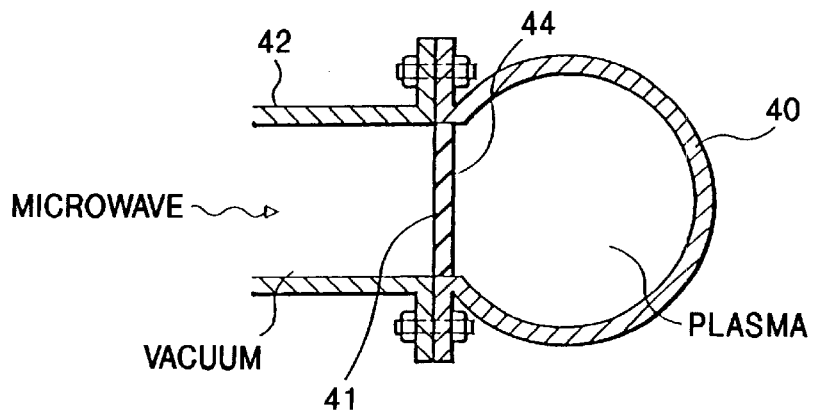
Figure 3C:
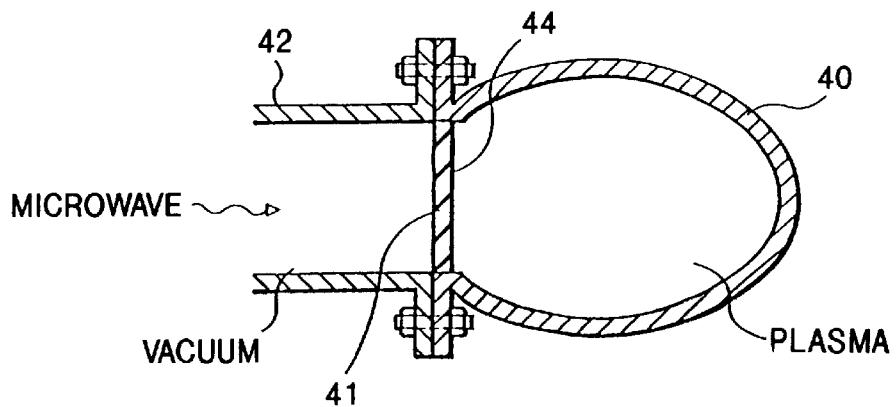

The sectional shape of the terminal end of a plasma excitation portion, i.e., the sectional shape of the laser tube 40 that makes up the laser chamber can be a nearly semi-cylindrical shape (or semi-elliptic shape) (FIG. 3A), a cylindrical shape (FIG. 3B), an elliptic shape (FIG. 3C), and the like, as shown in FIGS. 3A, 3B, and 3C.

Figure 4A:
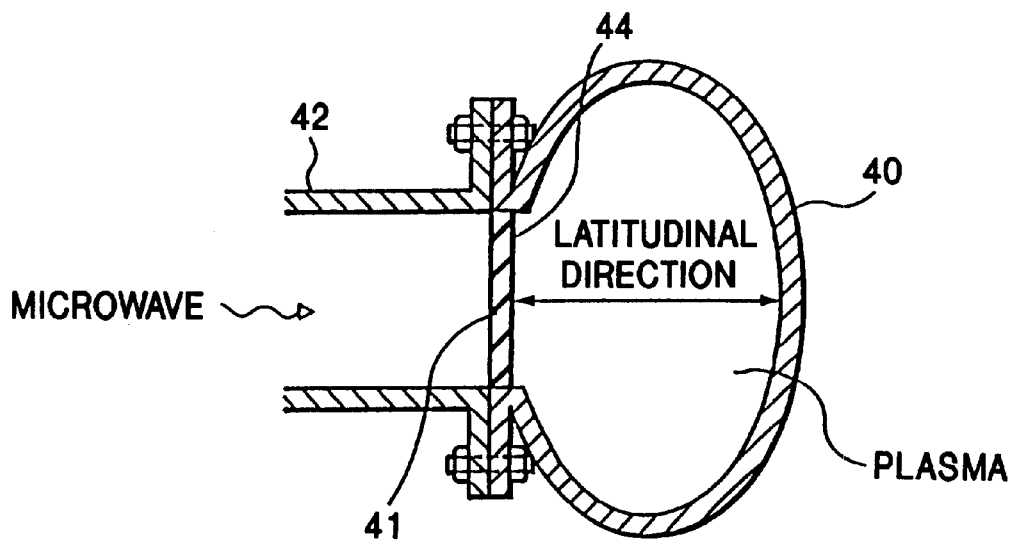
FIGS. 4A and 4B are sectional views showing other examples of the shapes of the laser tube.

Furthermore, an elliptic shape shown in FIG. 4A is more preferable. The minor axis direction of this ellipse agrees with the introduction direction of microwaves. Hence, in the case of the sectional shape shown in FIG. 4A, microwaves can be uniformly introduced into the laser gas as the laser medium in the laser tube. Also, a laser beam having a higher density per unit area can be obtained, and can be externally output.

Figure 4B:
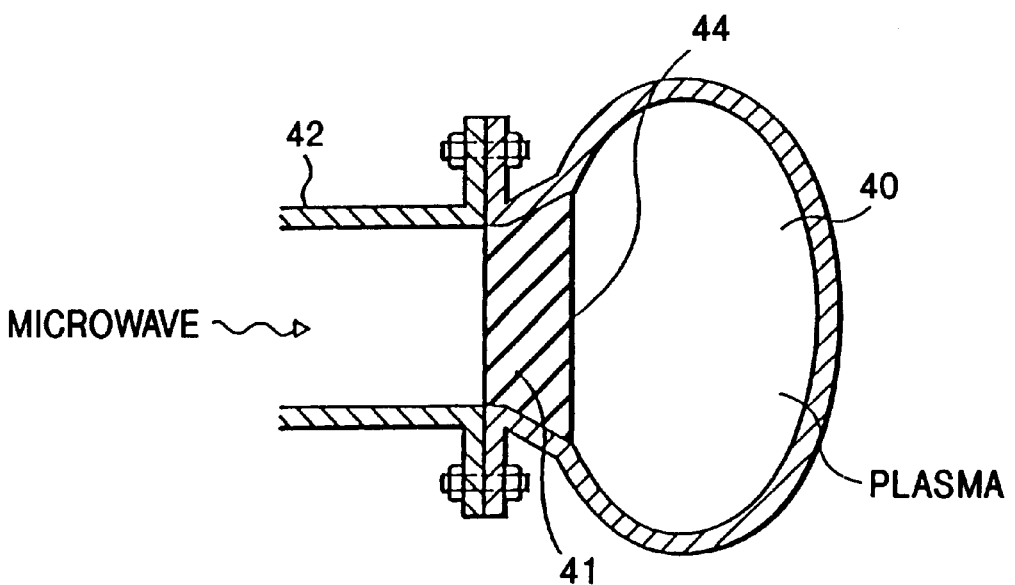

Furthermore, the window portion 44 of the laser tube 40 may be tapered wider toward the laser tube 40 side, as shown in FIG. 4B. Note that it may be tapered narrower toward the laser tube 40 side.

Connections between the laser tube 40 and the waveguide 42 can be accomplished by, e.g., sealed fastening by forming flange portions on them, as shown in FIGS. 3A, 3B, and 3C or FIGS. 4A and 4B.

In the present invention, no parts such as electrodes need be arranged inside the laser tube 40. More specifically, no electrodes or the like need be assembled into the laser tube 40 later. Hence, the insulating plate 41 may be attached in advance to the laser tube 40 depending on the manufacturing process. The insulating plate 41 may be attached by, e.g., shrink fit. In the case of FIG. 4B, the insulating plate 41 may be fitted from the inner side of the laser tube 40.

Note that the laser tube 40 constitutes the laser chamber, and its uppermost surface consists of a fluoride to suppress reactions with F*, KrF*, and ArF*, as described above.

When the main body of the laser tube 40 consists of a metal, easy manufacture is assured, and cooling efficiency can be improved. In particular, in order to prevent changes in optical resonator length due to changes in temperature, a metal having nearly zero thermal expansion coefficient is preferably used. In addition, a metal such as copper or silver having a high electric conductance is preferably formed on the inner surface of the laser tube by, e.g., plating, to have a thickness at least larger than the skin depth of microwaves.

As a preferred embodiment of the insulating plate 41, for example, at least the surface that contacts the plasma (the surface on the laser tube 40 side) is coated with a multilayered film (e.g., SiO$_2$, Al$_2$O$_3$, CaF$_2$, MgF$_2$, LaF$_2$ film, or the like), and its uppermost surface is formed with a thin fluoride film (e.g., CaF$_2$, MgF$_2$, LaF$_2$, or other thin fluoride films).

Furthermore, the insulating plate 41 must satisfy the following conditions for its materials: its materials have very small losses with respect to microwaves supplied, are mechanically robust, are insoluble in water, and so on.

The thickness of the insulating plate 41 need only correspond to integer multiples or substantially integer multiples of half the wavelength (intra-tube wavelength) of microwaves.

(Microwaves)

In the present invention, microwaves are used as an excitation means of the laser gas. Using the microwaves, the laser gas can be continuously excited and continuous emission is feasible.

As a microwave supply source, for example, a gyrotron (tradename) can be used.

The frequency and electric power of the microwaves can be appropriately determined depending on the partial pressures of component gases of the laser gas, and the like. In general, the frequency of the microwaves preferably falls within the range from 1 GHz to 50 GHz, more preferably, 5 to 40 GHz, and most preferably, 20 to 35 GHz. The electric power of the microwaves preferably falls within the range from several hundred W to several kW.

If the frequency, $\omega$, of excitation microwaves is, e.g., 35 GHz, a gas pressure at which the collision frequency $\omega c$ of electrons to Ne atoms, which is determined by the collision sectional area of Ne as the main body of a plasma excitation gas to electrons, equals the excitation microwave frequency, is 160 Torr.

In this state, the plasma excitation efficiency based on identical electric power is highest.

When the gas pressure of $Kr/Ne/F_2$ (3%/92%/5%) is set at the atmospheric pressure (760 Torr), the collision frequency is about 4.5 times the frequency of excitation microwaves, and electrons collide against Ne atoms 4.5 times during one cycle of the excitation frequency.

Accordingly, this state satisfies the Resistive Plasma condition, and the skin depth determined by the equation below equals a depth at which plasma excitation takes place efficiently:

$$\delta = (2/\omega\mu_0\sigma)^{1/2}$$

where $\omega$ is the angular frequency of microwaves, $\mu_0$ is the vacuum magnetic permeability, and $\sigma$ is the conductivity of the plasma.

When the frequency of the microwaves is 35 GHz, the gas pressure is 160 Torr, and the electron density is $10^{14}$ cm$^{-3}$, we have:

$\omega = 2\pi \times 35 \times 10^9$ [s$^{-1}$]

$\mu_0 = 4\pi \times 10^{-7}$ [H/m]

$\sigma = 12.8$ [$\Omega \cdot$m$^{-1}$]

Hence, the skin depth is:

$\delta = 750$ $\mu$m

For example, microwaves of 35 GHz are induced using a 5-mm high, 10-cm wide oversize waveguide.

The waveguide portion and the plasma excitation portion are hermetically sealed by an insulating plate of, e.g., $SiO_2$, $CaF_2$, $MgF_2$, or the like. The thickness of the insulating plate is set at substantially integer multiples of half the intra-tube wavelength $\lambda g$ also in consideration of the dielectric constant of the insulating plate.

Accordingly, when the frequency of microwaves is 17.5 GHz, the frequency equals the collision frequency at a gas pressure of 80 Torr. If the plasma frequency is 35 GHz, the electron density at that time is $5 \times 10^{-}$cm$^{-3}$. When a gas plasma at about the atmospheric pressure (1 atm) is produced from a gas pressure of 70 to 80 Torr using electric power ranging from 100 W to 1 kW at 35 GHz, F*, KrF*, and ArF* having a density on the order of $10^{14}$ cm$^{-3}$ can be reliably realized.

Upon supplying microwaves, the surfaces of the waveguide and insulating plate, which contact the plasma excitation portion, preferably comprise a reflection-free plate with respect to a wavelength of 248 nm or the like.

Figure 5:
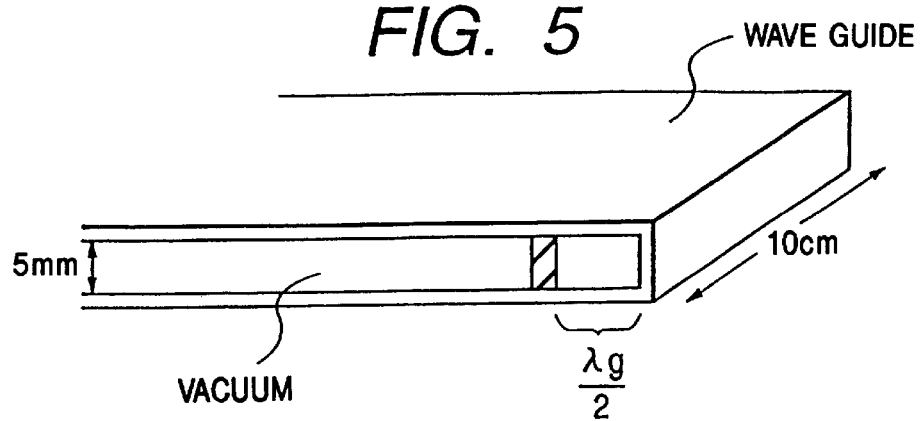
FIG. 5 is a perspective view showing the gap between the terminal end of a waveguide and an insulating plate.
Figure 6A:
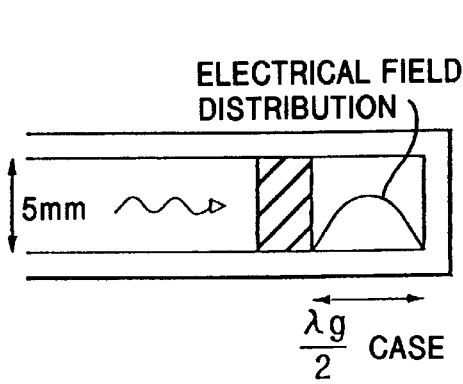
FIGS. 6A and 6B are sectional views showing the gap between the terminal end of the waveguide and the insulating plate.
Figure 6B:
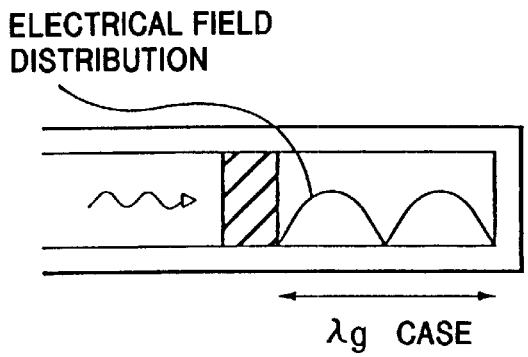

On the other hand, the gap between the waveguide and the insulating plate may be set at $\lambda g/2$, as shown in FIG. 5 or 6A, or $\lambda g$, as shown in FIG. 6B. Alternatively, the gap may be set at $3\lambda g/2$.

Note that the interior of the waveguide is preferably set in a vacuum state so as to prevent discharge. If a degree of vacuum of $10^{-4}$ Torr or less is assured, discharge can be prevented.

Note that the inner surface of the waveguide 42, which is in the vicinity of the contact portion with the laser tube 40, preferably comprises a reflection-free surface as in the inner surface of the laser tube 40. This is to prevent light reflected by the inner surface of the waveguide 42 from returning into the laser tube 40.

Figure 7:
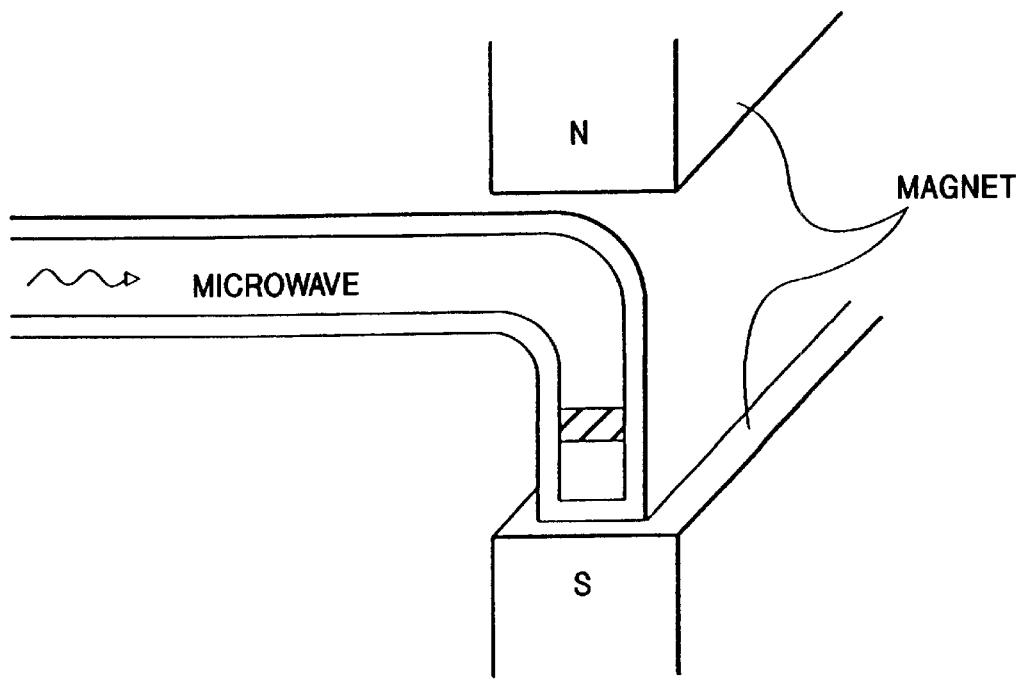
FIG. 7 is a perspective view showing application of a magnetic field.

Furthermore, an electromagnet or permanent magnet preferably applies an electric field to achieve stable discharge, as shown in FIG. 7.

(Microwave Introduction Means)

FIGS. 8A and 8B to 14 show examples of the structure of the microwave introduction means.

In the example shown in FIGS. 8A and 8B, a waveguide 1 that constitutes the microwave introduction means is a slot waveguide having a plurality of slots S. The slot waveguide 1 is connected to the outer surface of a laser tube 2 to extend in a direction parallel to its axial direction. Electromagnetic radiation (waves) of several GHz to several ten GHz is introduced from an upper portion of the slot waveguide 1, and propagates along the waveguide 1 as a TE$_{10}$ mode with an electric field normal to the page.

Figure 9A:
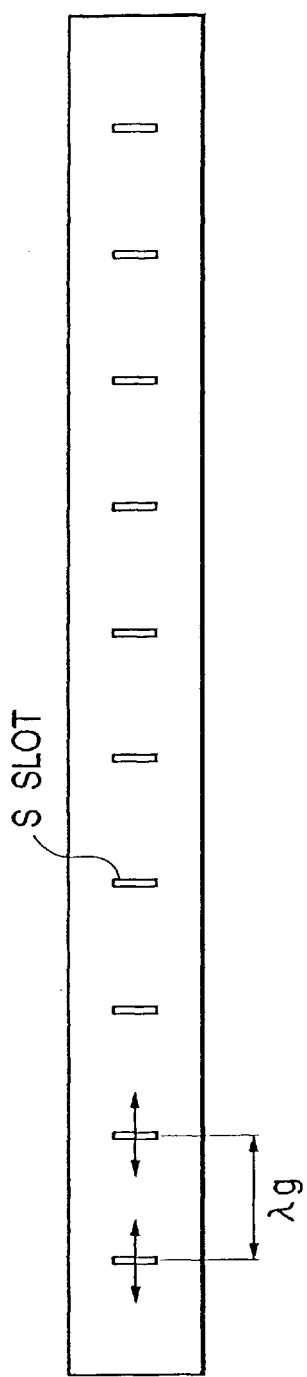
FIGS. 9A, 9B, and 9C are bottom views of a waveguide 1 in FIGS. 8A and 8B.
Figure 9B:
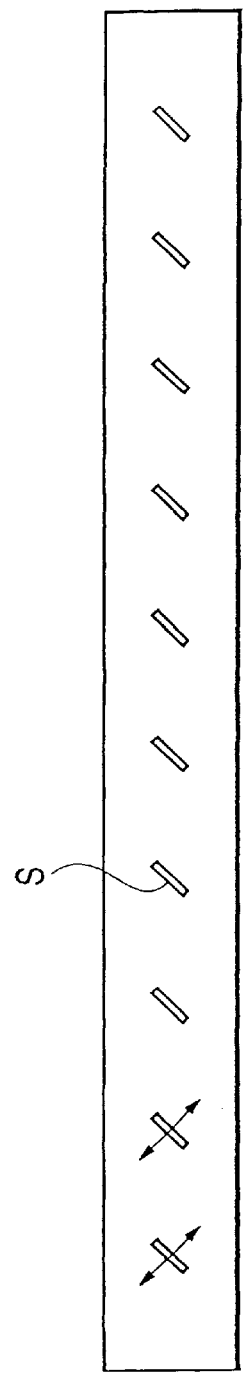
Figure 9C:
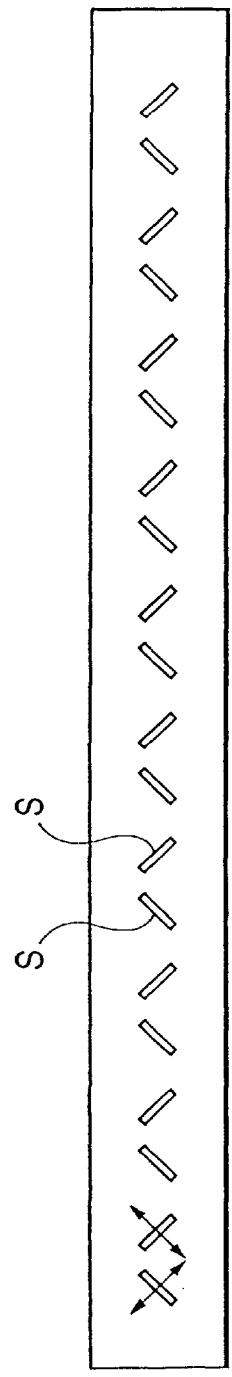

A large number of elongated slots S are formed on the lower surface (FIGS. 8A and 8B) of the slot waveguide 1, as shown in FIGS. 9A, 9B, and 9C, and the electromagnetic radiation is emitted outside the waveguide 1 via the slots S while propagating along the waveguide 1.

The electromagnetic radiation emitted from the slots S is introduced into the laser tube 2 via a dielectric plate 3, and ionizes a laser gas in the laser tube 2 to produce a plasma. A magnetic field generator 10 comprises a permanent magnet or electromagnet for applying a magnetic field in a direction perpendicular to the laser tube 2. As the permanent magnet used, an iron-vanadium magnet or Nd.Fe.B magnet having a strong magnetic force is suitable.

The magnetic field introduced into the laser tube 2 can trap electrons in the plasma to eliminate losses on the wall surface, and a higher-density plasma can be obtained. When the magnetic field strength is appropriately selected, a still higher-density plasma can be obtained by electron cyclotron resonance.

Of course, when a plasma having a sufficiently high density is obtained without applying any magnetic field, the need for the magnetic field generator 10 can be obviated.

Kr, Ne, and $F_2$ gases are supplied/exhausted into/from the laser tube 2 via, e.g., gas inlet ports 8. If the gases need not be exchanged upon generation of a plasma, since the gases need only be sealed in the laser tube 2, the gas inlet ports 8 are not required. In the plasma, radicals such as KrF or the like having a lifetime of about 10 nsec are continuously generated, and emit light when they dissociate into Kr and F. This light promotes induced emission while travelling back and forth in an optical resonator formed by an output-side mirror 5 and a reflection-side mirror 6, and is amplified by induced emission. The output-side mirror 5 has a reflectance of 90% or higher, and light transmitted through this output-side mirror is externally output as a laser beam.

In the example shown in FIGS. 8A and 8B, an aluminum alloy can be used as the material of the laser tube main body. In order to improve efficiency, a dielectric multilayered film is formed on the inner surfaces of the laser main body and the dielectric plate 3, so the reflectance at the oscillator length is zero (reflection-free).

In order to cool the laser tube 2 and the waveguide 1, a refrigerant such as cooling water, air, an $N_2$ gas, or the like can be supplied between a refrigerant chamber 7 having a cooling water inlet port 9, and these members. The slot waveguide 1 can be set in a vacuum state to prevent discharge therein.

FIGS. 9A, 9B, and 9C are bottom views of the slot waveguide 1.

In FIG. 9A, slots S pointing in a direction perpendicular to the axis of the waveguide 1 are arranged at intervals equal to the wavelength of electromagnetic radiation in the waveguide 1. The individual slots emit in-phase, linearly polarized electromagnetic waves, which are polarized in the axial direction of the waveguide.

In FIG. 9B, slots tilted 45° from the axis of the waveguide are arranged at intervals equal to the wavelength of electromagnetic radiation in the waveguide. The individual slots emit in-phase, linearly polarized electromagnetic waves, which are polarized in a direction tilted 45° with respect to the axial direction of the waveguide.

In FIG. 9C, pairs of orthogonal slots which are tilted 45° from the axis of the waveguide are arranged at intervals equal to the wavelength of electromagnetic radiation in the waveguide. The individual slots emit in-phase, circularly polarized electromagnetic waves.

The length of these slots is determined in correspondence with the electromagnetic radiation intensity distribution in the waveguide, so that the intensities of electromagnetic waves emitted from the individual slots nearly equal each other. The angle of the slots and the interval between adjacent slots are not limited to those described above.

Figure 10A:
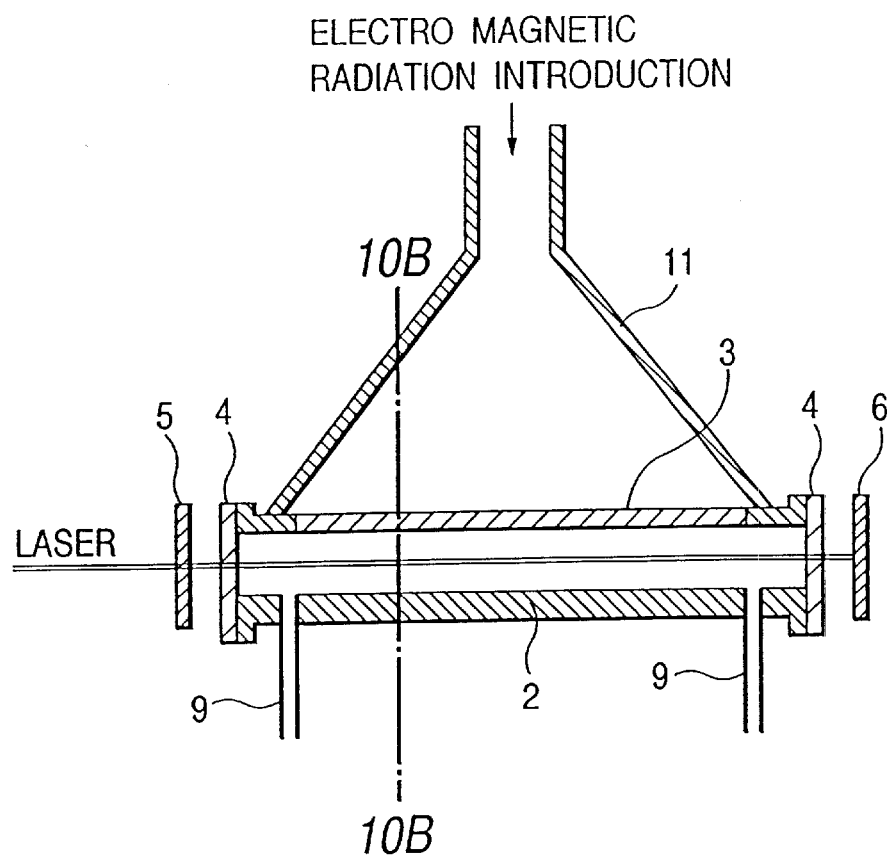
FIGS. 10A and 10B are respectively a cross-sectional view and a 10B—10B sectional view of a continuous emission excimer laser oscillation apparatus having a microwave supply device.
Figure 10B:
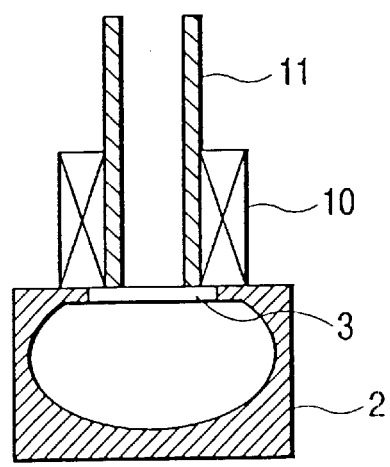

In the structure shown in FIGS. 10A and 10B, electromagnetic radiation of several GHz to several ten GHz is introduced from the upper portion of a tapered waveguide 11, is diverged by a tapered portion, and is then introduced into the laser tube 2 via the dielectric plate 3. In the example shown in FIGS. 10A and 10B, electromagnetic radiation propagates as a $TE_{10}$ mode with an electric field parallel to the page, near the electromagnetic radiation introduction portion of the tapered waveguide 11. Alternatively, the electric field may be normal to the page. Other arrangements are the same as those shown in FIGS. 8A and 8B.

FIGS. 11A and 11B, and FIGS. 12A and 12B show examples wherein microwaves are introduced as surface waves. In the structure shown in FIGS. 11A and 11B, electromagnetic radiation of several GHz to several ten GHz is introduced from an upper portion of a waveguide 12 with a gap, which uses a cylindrical induction tube, and propagates in the tube as a TE10 mode with an electric field parallel to the page. An electric field in the tube axis direction of an induction tube 14 is applied from a gap portion of the waveguide 12 with the gap. The introduced microwaves become surface waves which propagate from the gap portion in the right and left tube axis directions in the induction tube 14. Electrons in the plasma are accelerated by this surface wave electric field, thus maintaining a high-density plasma.

Since surface waves which attenuate slowly and have an identical mode propagate from the central portion of the laser tube, no local intensity distribution of the microwave electric field is formed. Accordingly, since uniform plasma excitation takes place on the plasma surface, a high-density plasma can be efficiently generated. Since the microwave electric field need only be applied to the gap portion alone, the microwave circuit is very simple. This plasma generation method is most suitable for oscillating a thin laser since a long, high-density plasma which is as thin as several mm can be efficiently generated. In the example shown in FIGS. 11A and 11B, the induction tube 14 consists of $CaF_2$. A movable short-circuiting plate 13 is arranged to suppress reflection to an electromagnetic radiation generator by adjusting the short-circuiting position, but need not be movable. When the frequency of electromagnetic radiation is high and the waveguide has a sufficiently small size, the gap portion of the waveguide is not required. The magnetic field generator 10 comprises a permanent magnet or electromagnet, and generates a magnetic field in the tube axis direction of the induction tube 14. Other arrangements are the same as those in FIGS. 8A and 8B.

Figure 12A:
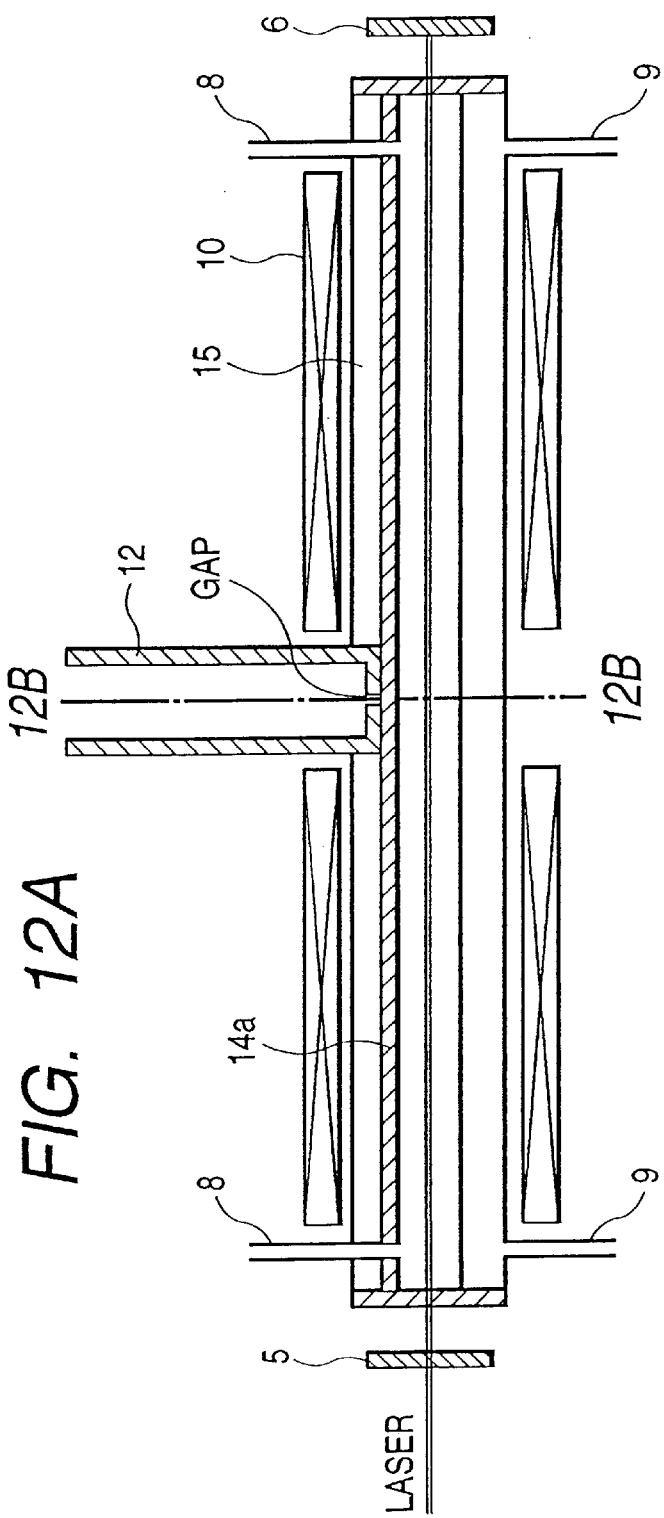
FIGS. 12A and 12B are cross-sectional views of another continuous emission excimer laser oscillation apparatus having a microwave supply device.
Figure 12B:
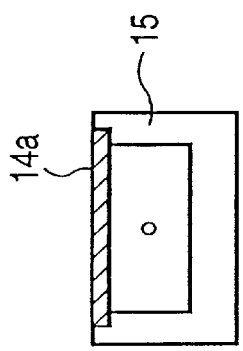

FIGS. 12A and 12B show an example wherein an induction plate 14a is used. This structure is the same as that using a cylindrical induction tube in principle, and is suitable for generating a wide, thin plasma. Since the portion below the plasma does not contribute to plasma generation, a high-speed gas flow in a direction perpendicular to the laser tube axis is easy to obtain in this portion.

Figure 13:
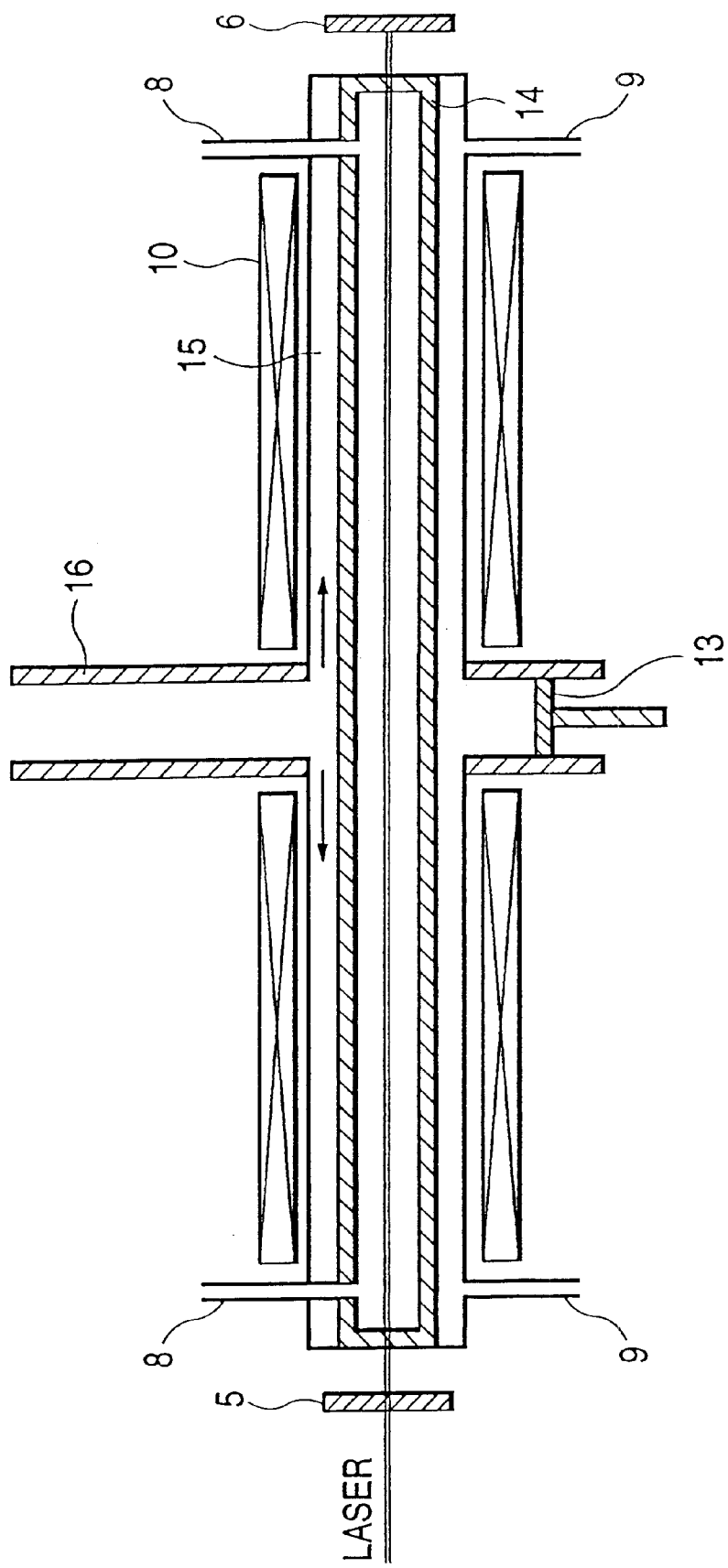
FIG. 13 is a cross-sectional view of a continuous emission excimer laser oscillation apparatus having a microwave supply device.

In the structure shown in FIG. 13, electromagnetic radiation of several GHz to several ten GHz is introduced from an upper portion of a coaxial conversion waveguide 16, and propagates in the tube as a TE10 mode with an electric field parallel to the page. This electromagnetic radiation propagates while changing its mode to electromagnetic radiation in the right-and-left directions, that propagates between a shield plate 15 and the plasma in the induction tube 14. A high-density plasma is generated by RF currents that flow on the plasma surface. Other arrangements are the same as those shown in FIGS. 8A and 8B to 12A and 12B.

Figure 14:
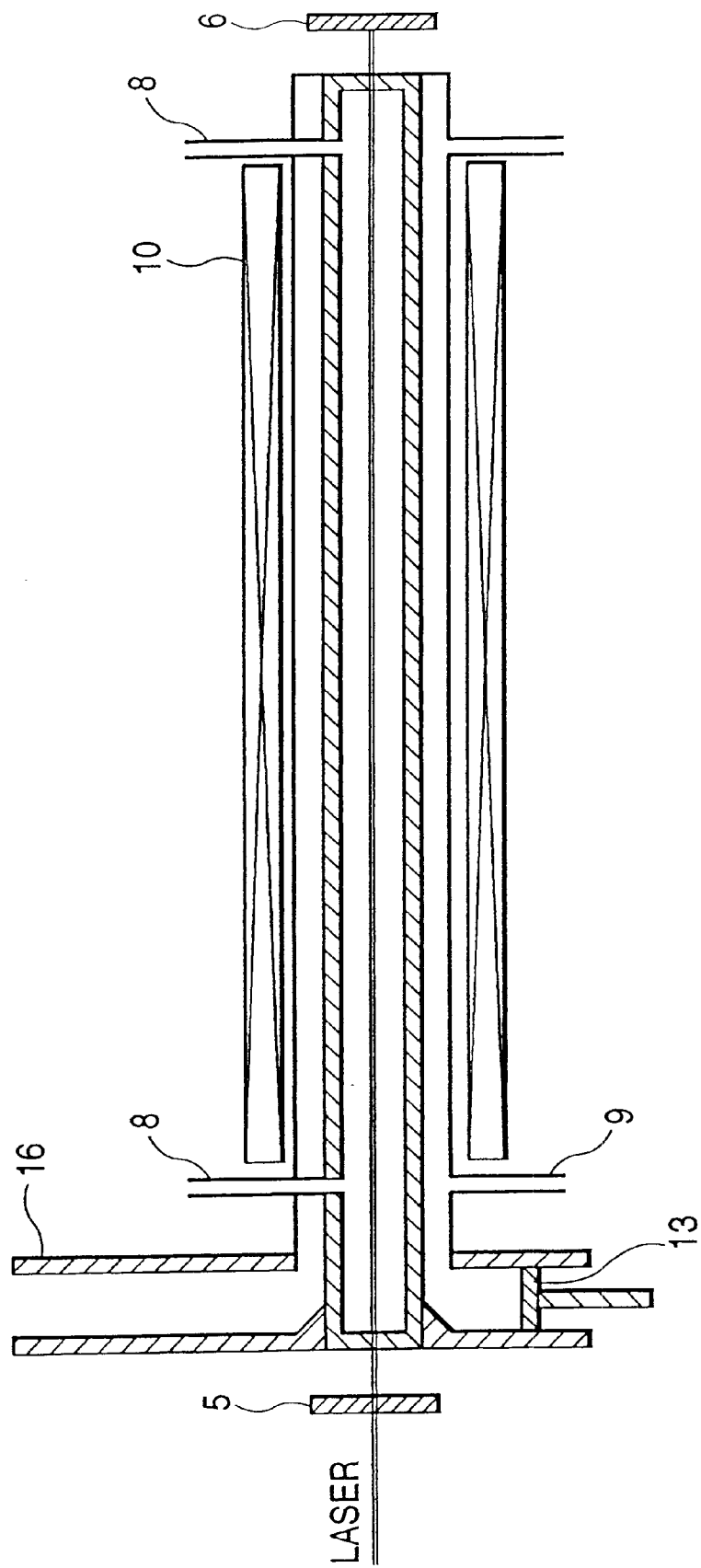
FIG. 14 is a cross-sectional view of a continuous emission excimer laser oscillation apparatus having a microwave supply device.

In the structure shown in FIG. 14, electromagnetic radiation of several GHz to several ten GHz is introduced from the upper portion of the coaxial conversion waveguide 16, and propagates in the tube as a TE mode with an electric field parallel to the page. This electromagnetic radiation propagates while changing its mode to electromagnetic radiation in the right direction, that propagates between the shield plate 15 and the plasma in the induction tube 14. Other arrangements are the same as those in FIG. 13.

(Shape of Microwave Introduction Means etc.)

In a stable resonator, a certain permanent mode is formed, and a mode having the smallest beam spot radius is the TEM00 mode (fundamental mode) having a Gaussian distribution. In order to build a resonator, a space that can propagate at least the fundamental mode without any losses is required. The beam spot radius of the fundamental mode is defined by the wavelength of the laser beam, the length of the resonator, and the radius of curvature of the mirror of the resonator, and can be expressed using L: the resonator length, R: the radius of curvature of the mirror, and a g parameter (g=1−L/R), as shown in FIG. 15A.

Figure 15A:
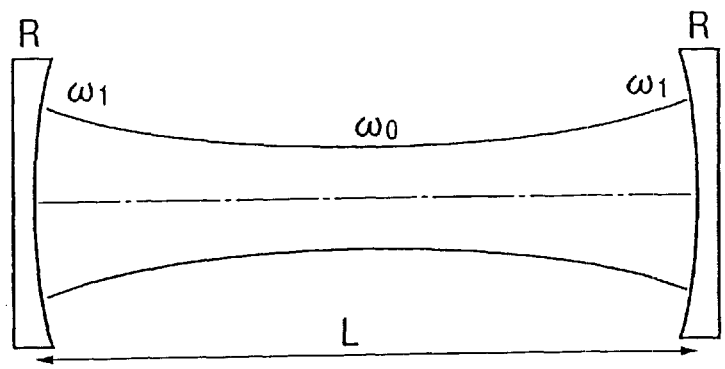
FIGS. 15A and 15B are graphs showing changes in beam spot radius.
Figure 15B:
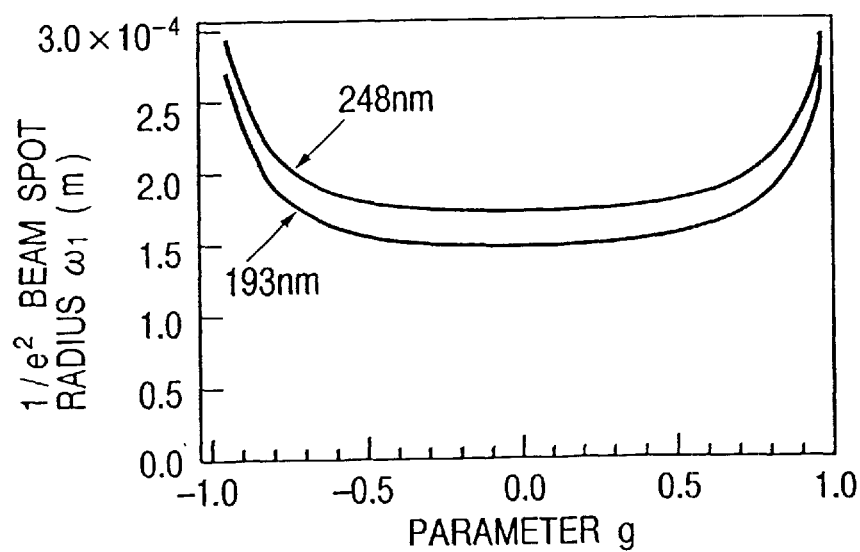

FIG. 15B shows the calculation result of the $1/e^2$ beam spot radius of the fundamental mode on the mirror (resonator end portion) of a symmetrical stable resonator while assuming the resonator length L=200 mm. The abscissa plots the g parameter.

As shown in FIGS. 15A and 15B, the beam spot radius changes in the optical axis direction. Therefore, when a stable resonator is used, a problem arises: a high-gain region, i.e., a region with a high plasma density immediately below the microwave introduction portion of the laser chamber is not included in the optical path.

To solve this problem, when the microwave introduction means on the laser chamber side is deformed to have a shape corresponding to the beam spot radius, the high-gain region, i.e., the region with a high plasma density immediately below the microwave introduction portion of the laser chamber can be included in the optical path.

Figure 16A:
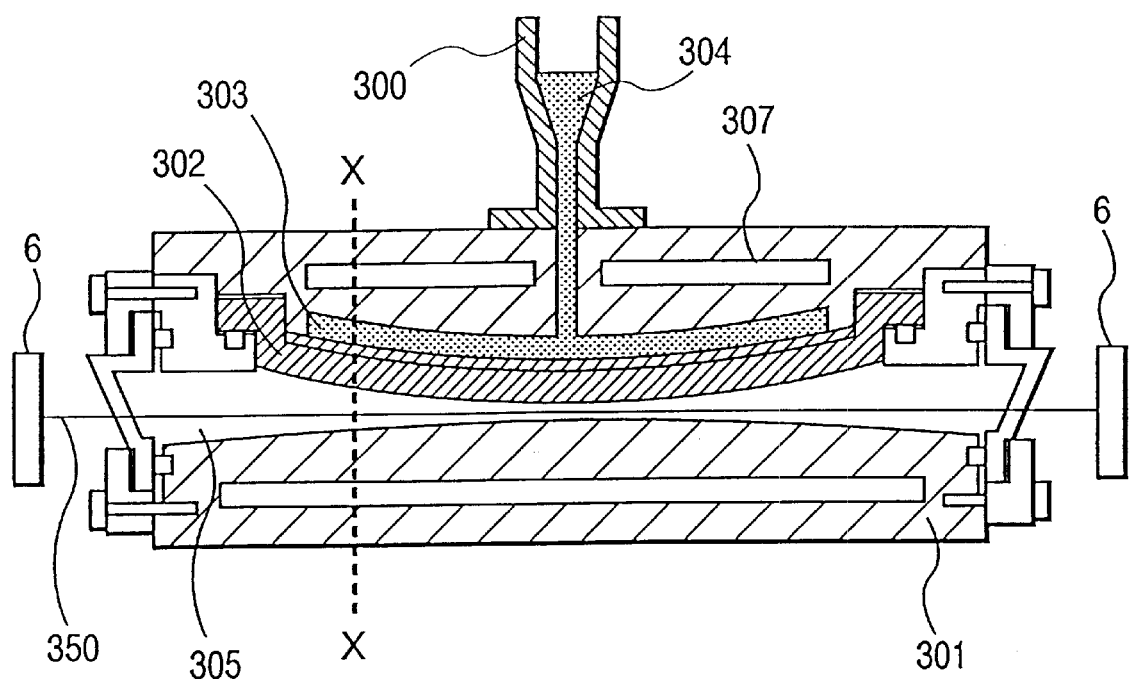
FIGS. 16A and 16B are sectional views of a laser oscillation apparatus.

FIG. 16A shows this example. In FIG. 16A, a laser oscillation apparatus comprises a laser 301, a dielectric plate 302, a slot plate 303, an optical axis 350, reflection mirrors 6, a powder 304, a laser chamber 305, and cooling water 307. In FIG. 16A, the microwave introduction means is made up of a waveguide consisting of an introduction portion 300 and the slot plate 303 having slots (not shown in FIGS. 16A and 16B), and the dielectric plate 302. The distance between the dielectric plate 302 and the optical axis 350 of the resonator is changed in correspondence with changes, in the direction of the optical axis 350, in beam spot radius in a direction perpendicular to the optical axis 350. More specifically, the distance between the dielectric plate 302 and the beam outer periphery is made constant. Note that the powder 304 (e.g., AlN) is filled in the waveguide to facilitate introduction of microwaves and to attain a size reduction of the waveguide.

Figure 16B:
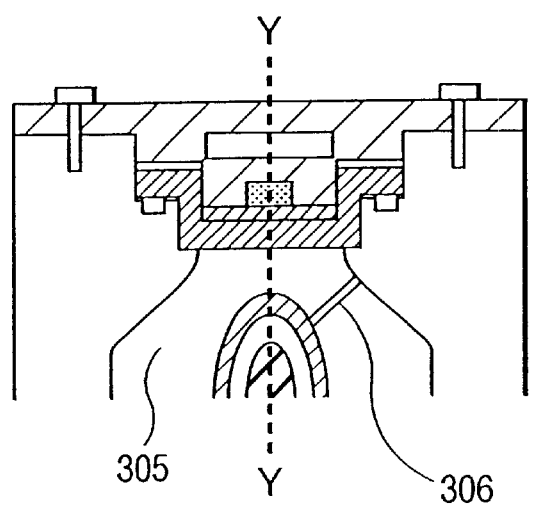

When the shape of the dielectric plate 302 on the laser chamber 305 side is defined not by a plane but by a curved surface, as shown in FIG. 16A, the laser gas flow is disturbed (turbulent flow), resulting in diffraction losses. To avoid this, as shown in FIG. 16B, a baffle plate (means for shaping the laser gas flow into a laminar flow) 306 is preferably arranged at the laser gas inlet port. This plate can form the laser gas flow into a uniform laminar flow.

The baffle plate 306 also has a function of confining the generated plasma in the laser chamber 305. Note that another baffle plate may be arranged at the downstream side to obtain such function.

The laminar flow can be easily realized using the baffle plate 306 which has a conductance smaller than that in the laser chamber.

As the baffle plate, a honeycomb plate or a plate with many slits is preferably used.

Near the center of the laser chamber the slits are preferably formed at higher density than those formed at the peripheral portion, since the gas can be uniformly flowed at high speed.

At least the surface of the rectification plate 306 consists of a fluoride such as $AlF_3$, $MgF_2$, or the like.

Figure 17A:
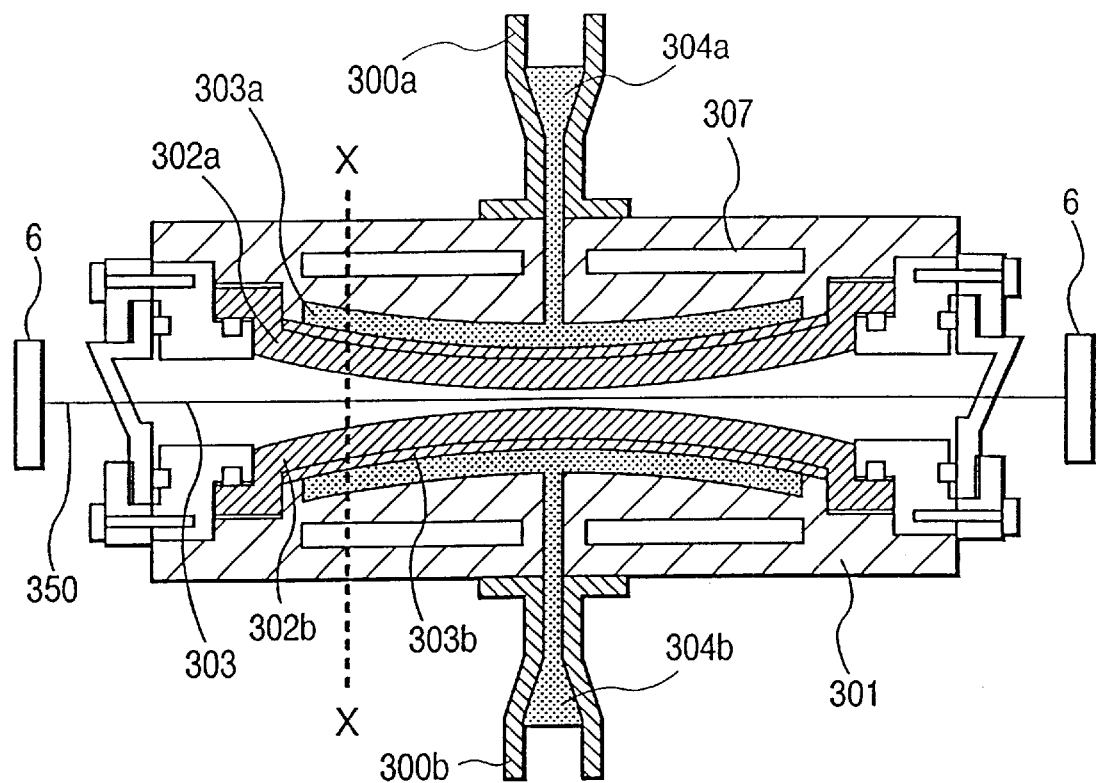
FIGS. 17A and 17B are sectional views of a laser oscillation apparatus.
Figure 17B:
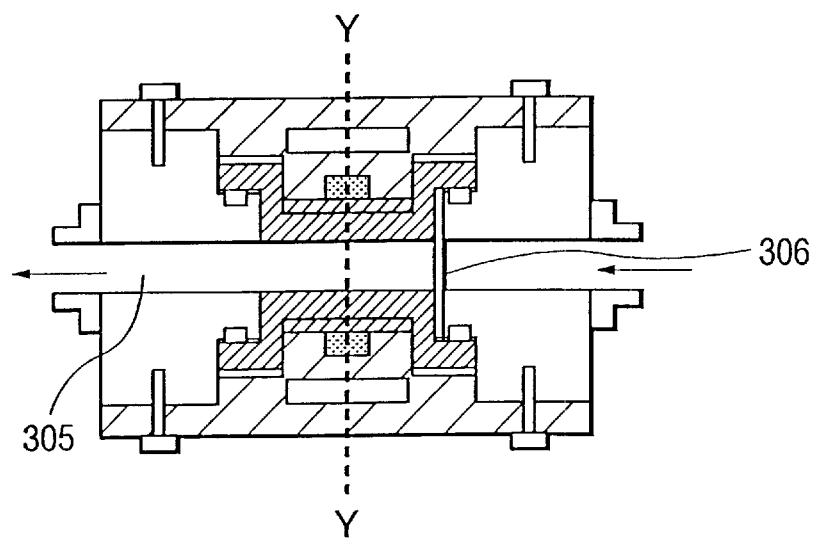

FIGS. 16A and 16B show a case wherein a single microwave introduction means is arranged. Alternatively, as shown in FIGS. 17A and 17B, two microwave introduction means may be arranged to be symmetrical about the optical axis 350. When the two means are symmetrically arranged, a gain can be obtained twice as much as compared to that obtained by the single means.

Note that the technique for deforming the shape of the microwave introduction means on the laser chamber side in correspondence with the beam outer peripheral shape is particularly effective in a continuous emission excimer laser oscillation apparatus, and can also be applied to other laser oscillation apparatuses that generate a plasma by introducing microwaves.

On the other hand, when the microwave introduction means is constituted by the waveguide consisting of the introduction portion 300 and the slot plate 303, and the dielectric plate 302, the dielectric plate 302 requires a complicated working/attachment process. Also, in terms of easy working/attachment, the dielectric plate 302 must be thick to some extent.

When a dielectric plate 410 is thick, as shown in FIG. 18A, microwaves diverge in a laser chamber 430. Accordingly, large electric power is required to obtain a dense plasma. FIG. 18B shows a case wherein the dielectric plate 410 is thinner than that in FIG. 18A, and the divergence of microwaves is smaller than that in FIG. 18A.

To avoid such problem, in the present invention, dielectric members are preferably buried in slots 530 of a slot waveguide 500 without using any dielectric plate, as shown in FIG. 19. When no dielectric plate is used in this manner, microwaves having a very small width are introduced, as shown in FIG. 18C. As a result, a plasma having a higher density than that obtained by inputting identical microwave electric power can be excited, and the gain of the laser can be increased.

As the slot shape, a rectangular shape whose long side extends in the optical axis direction is preferable, as shown in FIGS. 20A and 20B.

A single, continuous rectangle may be formed (FIG. 20B), but rectangles are preferably formed intermittently.

When the long side of each rectangle is set parallel to the optical axis direction, a narrow plasma can be excited. As a result, a plasma having a higher density than that obtained by inputting identical microwave electric power can be excited, and the gain of the laser can be increased.

(Supply Mode of Laser Gas)

FIGS. 21A and 21B show an excimer laser oscillation apparatus according to another embodiment of the present invention. The microwave introduction method and arrangement are the same as those in the excimer laser oscillation apparatus shown in FIGS. 8A and 8B, and microwaves generated by a gyrotron as a microwave power supply (not shown) are introduced into a laser tube 2 via a rectangular waveguide 1 and a slot plate 3.

On the other hand, in the apparatus described above with reference to FIGS. 8A and 8B, the laser gas can be supplied from one end portion of the laser tube in the longitudinal direction, and can be exhausted from the other end portion in the longitudinal direction. In contrast to this, in the excimer laser oscillation apparatus of this embodiment, elongated holes are formed along the longitudinal direction of the laser tube 2, and are used as laser gas outlet ports 22. With this arrangement, the laser gas supplied from an inlet port 21 is exhausted from the outlet ports 22 on both sides via the discharge space in the laser tube.

In order to stably obtain a continuously emitted excimer laser beam, a thin beam should be formed. For example, in order to obtain an output of 1 kW by a laser beam intensity of 1.3 $MW/cm^2$, a plasma need only be obtained within a region having a diameter of about 0.3 mm. Since the above-mentioned apparatus shown in FIGS. 21A and 21B can concentratively generate a plasma in such narrow region, a thin, continuously emitted excimer laser beam can be obtained.

At this time, the reflectance of a mirror 6 is preferably set at 100%, and that of a mirror on the output side is preferably set at 99%.

In order to stably obtain a continuously emitted excimer laser beam, a state wherein fluorine molecules ($F_2$) and fluorine ions ($F^-$) exist in the discharge space to be able to sufficiently form excimers (KrF*) must be set. For this purpose, it is preferable that a large amount of fresh fluorine gas ($F_2$) be supplied into the discharge space at high speed, and fluorine atoms (F) that return to the ground state after laser beam emission be exhausted from the discharge space.

In this embodiment, in order to attain high-speed circulation/substitution of the laser gas, laser gas inlet and outlet ports are formed, so that a fresh laser gas is supplied from a direction perpendicular to the longitudinal direction of the laser tube (the longitudinal direction of the discharge space), and the used laser gas is exhausted from that direction.

Such high-speed circulation of the gas also has an effect of cooling the laser tube since the gas and plasma present in the discharge space are substituted at high speed.

FIGS. 22A and 22B show the structure that can realize further high-speed circulation of the laser gas. As shown in FIG. 22B, the gas flow portion in the discharge space is narrower than a gas inlet port 23 and a gas outlet port 24, and as a consequence, high-speed gas circulation/substitution is attained in the discharge space.

As for the layout of magnets 10 that confine a plasma in a narrow region, the present invention is not limited to the specific layout shown in FIGS. 21A and 21B, in which the magnets are arranged to generate lines of magnetic force in a direction to cross the longitudinal direction of the laser tube. For example, the magnets may be arranged to generate lines of magnetic force along the longitudinal direction of the laser tube.

Figure 23A:
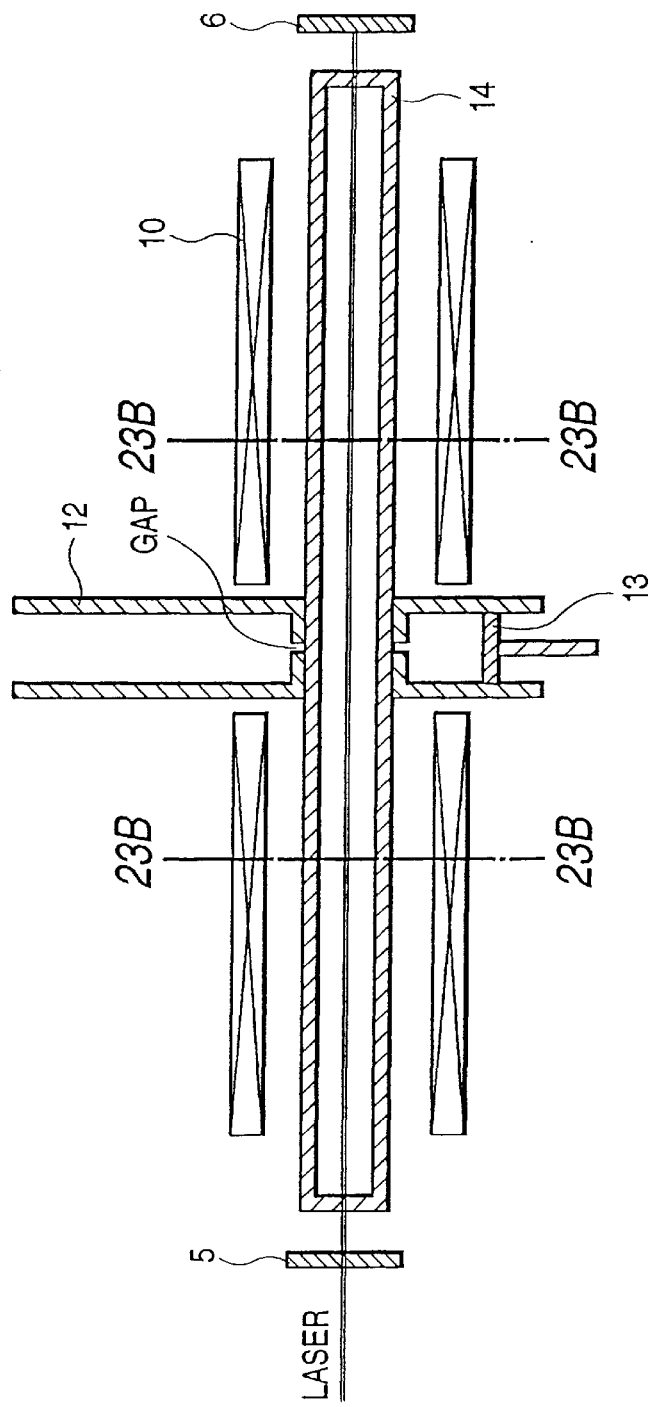
FIGS. 23A and 23B are sectional views of an excimer laser oscillation apparatus according to another embodiment of the present invention.
Figure 23B:
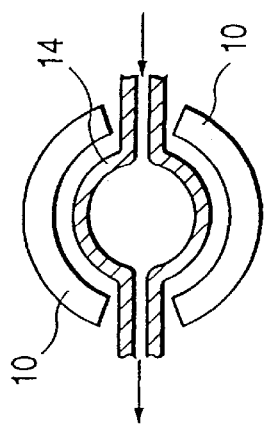

FIGS. 23A and 23B show an excimer laser oscillation apparatus according to still another embodiment of the present invention.

The microwave introduction method and arrangement are the same as those in the excimer laser oscillation apparatus shown in FIGS. 11A and 11B, and microwaves generated by a gyrotron as a microwave power supply (not shown) are introduced into a laser tube 14 via a rectangular waveguide 12 and a gap. The microwaves propagate along the wall of the laser tube in the longitudinal direction to cause discharge in the laser tube 14, thereby generating a laser gas plasma.

The laser gas supply method of the apparatus shown in FIGS. 23A and 23B is different from that of the apparatus shown in FIGS. 11A and 11B.

In the apparatus shown in FIGS. 11A and 11B, a laser gas is supplied from one end portion of the laser tube in the longitudinal direction to form a gas flow along the longitudinal direction. On the contrary, in the apparatus shown in FIGS. 23A and 23B, two elongated holes are formed on the side walls of the laser tube so that their longitudinal direction agrees with that of the laser tube, and a laser gas is supplied from one hole and is exhausted from the other hole.

With this arrangement, the laser gas flows in the laser tube to cross the longitudinal direction of the laser tube. In this embodiment as well, since the gas and/or plasma in the discharge space can be substituted at high speed, excimers can be stably generated in the discharge space. Also, an effect of cooling the laser tube is expected.

The above-mentioned gas supply/exhaust method can be applied to all the above-mentioned apparatuses.

Upon supplying the laser gas, the pressure at the inlet port is preferably set at 1.2 to 1.8 times that at the outlet port, and more preferably, 1.2 to 1.5 times.

When the pressure at the inlet port is set at 1.2 times or more that at the outlet port, the laser gas that passes through the laser chamber undergoes volume expansion, and cools the plasma excitation portion. On the other hand, when the pressure at the inlet port is set at 1.8 times or more that at the outlet port, the pressure difference becomes too large, and the pressure distribution offset in the laser chamber becomes large.

(Cooling)

Since a laser beam of about 10 W is obtained by introducing microwaves of about 100 W to 1 kW, a considerable amount of heat is produced. Since the wavelength changes if thermal expansion occurs, precise cooling is required. It is preferable that this portion use a metal free from any thermal expansion, and copper or silver plating be formed on its inner surface.

The reason why the plasma excitation portion is made up of a metal is to improve the cooling efficiency. Water cooling is attained while controlling the cooling water temperature, cooling water flow rate, and cooling water pressure. For example, cooling is preferably performed by a cooling device shown in FIG. 29. When cooling water is deaerated and the water supply pressure is set at about 1 kg/cm$^2$, conveniently no vibration is generated upon supplying cooling wafer with pressure.

(Resonator)

When a pair of reflection mirrors are arranged on the optical axis of the laser tube, a laser beam can be taken out by induced emission.

When a continuously emitted excimer laser beam is obtained by maintaining the light intensity at a given level while decreasing the beam spot size, as will be described later, it is preferable that the reflectance of one reflection mirror be set at 100% and that of the output-side reflection mirror from which a laser beam is taken out be set at 99.0%.

On the other hand, when the light intensity is maintained by extremely eliminating losses in the resonator, the reflectance of one reflection mirror is preferably set at 100%, and that of the output-side reflection mirror is preferably set at 99.5% or higher, and more preferably, 99.9% or higher.

Figure 24A:
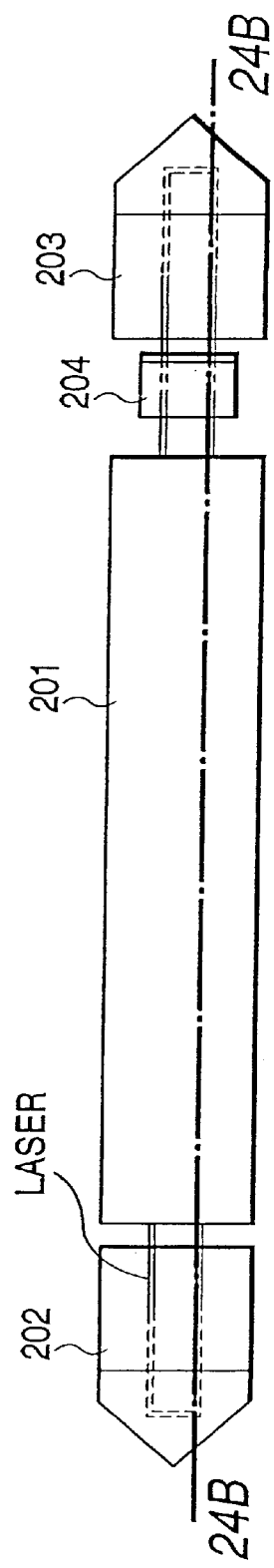
FIGS. 24A and 24B are respectively a front view and a side view of a resonator which sets a reflectance of 100% at both ends using prisms.
Figure 24B:
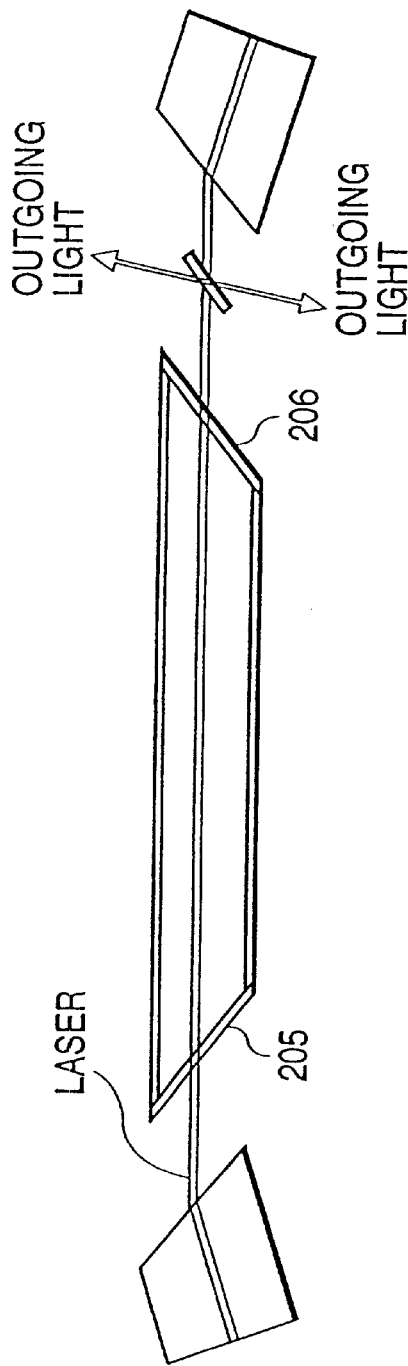

FIGS. 24A and 24B show the arrangement of a resonator in which reflectances at both ends become 100% using prisms. The incident angles to total reflection prisms 202 and 203 are Brewster angles, and no light amount losses are produced upon incidence of light. Reflection inside the total reflection prisms 202 and 203 utilizes total reflection, and no light losses occur upon reflection, either. Accordingly, the reflectances at both ends of the resonator become 100%. The reflectance of outgoing light can be set within the range from 0% to several % by adjusting the incident angle on an outgoing light taking out plate 204 arranged between a laser tube 201 and the total reflection prism 203.

In the example shown in FIGS. 24A and 24B, since right and left propagating waves are reflected at two positions each on both surfaces of the outgoing light taking out plate, the number of outgoing beams is as many as 8. Since these outgoing beams must be processed, the apparatus becomes complicated. In order to reduce the number of outgoing beams and to prevent the apparatus from being complicated, modifications shown in FIGS. 25A, 25B, and 25C may be used.

In the modification shown in FIG. 25A, two outgoing beam taking out plates a and b are arranged in correspondence with beams in the resonator, and one plate b is set at the Brewster angle. Since beams in the resonator are linearly polarized, the outgoing taking out plate b set at the Brewster angle does not produce any reflected light. Therefore, the number of outgoing beams is 4. The reason why the outgoing light taking out plate b is arranged is to correct the positional shift of beams caused by the outgoing light taking out plate b.

In the modification shown in FIG. 25B, outgoing light is taken out using diffraction of beams in the resonator. An output mirror is arranged to contact one of beams in the resonator, and one or both surfaces thereof are high-reflection coated. Diffraction light piercingly coming to the output mirror is reflected by the high-reflectance coat surface, and becomes an outgoing beam. The number of outgoing beams is 2.

In the modification shown in FIG. 25C, outgoing light is taken out by utilizing evanescent waves. An evanescent wave taking out prism is arranged to face the total reflection surface of the total reflection prism 202 or 203 to be separated by an interval nearly equal to the wavelength, thereby taking out leaked light (i.e., evanescent waves) as outgoing light. The number of outgoing beams is 2.

(Exposure Apparatus)

Figure 26:
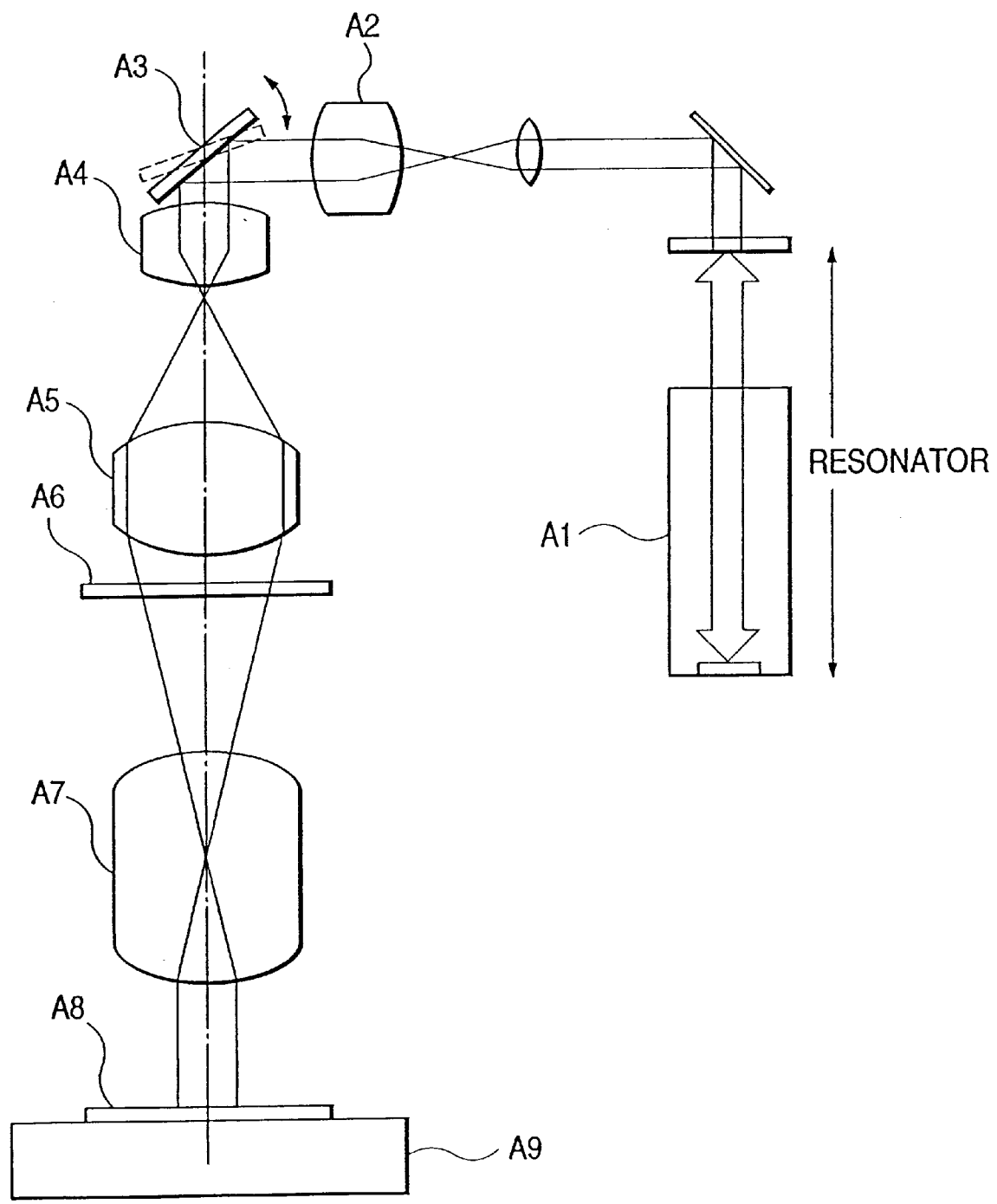
FIG. 26 is a schematic view of an excimer laser exposure apparatus.

FIG. 26 shows an exposure apparatus using an excimer laser oscillation apparatus.

Light output from an oscillation apparatus A1 is supplied to a scanning optical system via a mirror and a lens A2.

The scanning optical system has a scanning lens A4 and a scanning mirror A3 whose angle can be changed. Light output from the scanning optical system is irradiated onto a reticle A6 having a mask pattern via a condenser lens A5. The illumination optical system of the exposure apparatus has the above-mentioned arrangement.

Light having a density distribution corresponding to the predetermined mask pattern on the reticle A6 is imaged on a wafer A8 placed on a stage A9 by an imaging optical system having an objective lens 7, and a latent image corresponding to the mask pattern is formed on a photosensitive resist on the surface of the wafer A8.

As described above, the exposure apparatus shown in FIG. 26 comprises the excimer laser oscillation apparatus A1, the illumination optical system, the imaging optical system, and the stage A9 that holds the wafer A8.

In this apparatus, a narrow-band module (not shown) is arranged between the oscillation apparatus A1 and the scanning optical system. Also, the oscillation apparatus A1 itself is of pulse oscillation type.

(Output Method Example of Exposure Apparatus)

In order to turn on/off the use of outgoing light of the continuous emission excimer laser, the following methods may be used.

(1) A cutoff means is arranged outside the excimer laser device.

(2) The continuous excitation means is turned on/off.

However, in method (1), since an excimer laser outputs Deep UV light, and the output is higher than those of other lasers, the cutoff means is considerably damaged, and the service life of the cutoff means is short. The service life of a cutoff means that uses an AO (acoustooptic) element having high response characteristics is particularly short. Even when the outgoing light is cut off, since oscillation continues inside the laser, the optical system in the laser is unwantedly damaged, and its service life is shortened.

In method (2), in order to form a stable excited state, a certain period of time is required. For this reason, desired continuous oscillation light cannot be obtained immediately after the continuous excitation means is turned on.

The present invention will be described in detail below with the aid of the illustrated embodiment.

Figure 27:
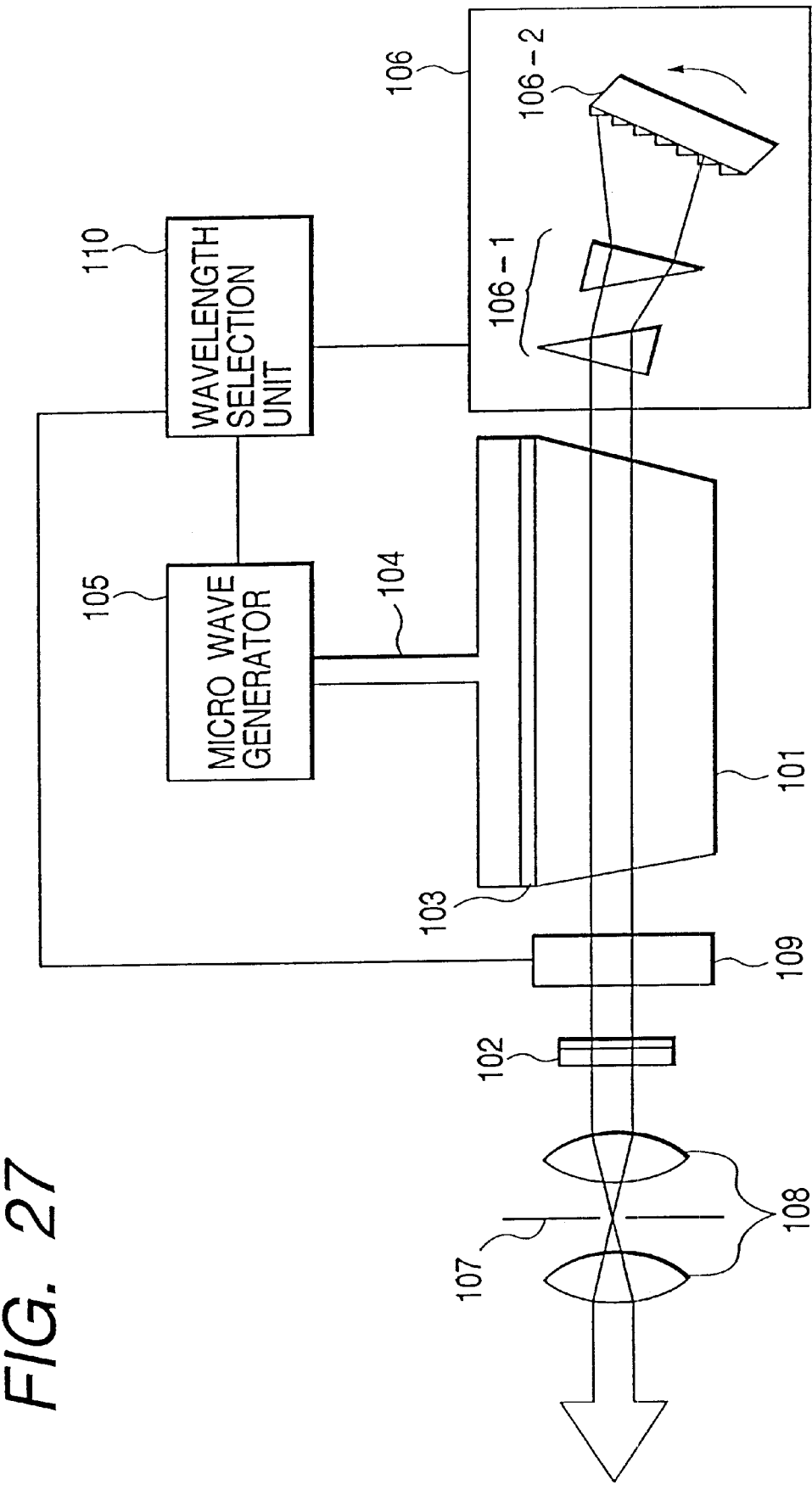
FIG. 27 is a schematic diagram of an excimer laser according to an embodiment of the present invention.

FIG. 27 is a schematic diagram of a continuous oscillation excimer laser according to the present invention. The excimer laser comprises a laser chamber 101 in which Kr, Ne, and $F_2$ gases are sealed, an output mirror 102 for outputting light from the laser, a dielectric member 103 for introducing microwaves into the laser chamber, a slot waveguide 104 for guiding microwaves, and a microwave generator 105 for supplying microwaves. A wavelength selection unit 106 selects the oscillation wavelength, and is made up of a magnifying prism 106-1 which consists of a pair of prisms and magnifies the beam spot size, and a diffraction grating 106-2 for extracting an arbitrary wavelength. A spatial filter 107 is arranged at the focal point position of the laser-side lens of a beam shaping optical system 108 consisting of a pair of lenses, and controls the divergence angle of outgoing light from the laser. A shutter 109 is arranged between the laser chamber and the output mirror. A control system 110 controls the wavelength selection unit 106, the microwave generator 105, and the shutter 109.

Note that the output mirror 102 and the diffraction grating 106-2 make up a resonator of the excimer laser.

(Description of Operation)

Microwaves supplied from the microwave generator 105 are guided by the slot waveguide 104, and continuously excite an excimer laser gas in the laser chamber 101 via the dielectric member 103. Light from the excited excimer laser gas enters the diffraction grating 106-2 via the magnifying prism 106-1. Only light in a predetermined wavelength region returns from the diffraction grating to the laser chamber 101 via the magnifying prism 106-1, and brings about induced excitation emission by the excited excimer laser gas. The light is sequentially subjected to induced emission while travelling back and forth in the optical resonator made up of the output mirror 102 and the diffraction grating 106-2, and only the light in the predetermined wavelength region selected by the diffraction grating is amplified. Some light components of the sensitized light are output via the output mirror 102.

The operation for turning on/off the use of outgoing light from the continuous oscillation excimer laser will be explained below.

When outgoing light from the continuous oscillation excimer laser is cut off, the control system 110 closes the shutter 109 to cut off light coming from the excimer laser gas to the output mirror 102 while continuously supplying microwaves. Light which has been oscillating in the optical resonator ceases to oscillate, and outgoing light from the continuous oscillation excimer laser can be immediately cut off.

When outgoing light from the continuous oscillation excimer laser is used again, the control system 110 opens the shutter 109 to allow light coming from the excimer laser gas to reach the output mirror 102, while continuously supplying microwaves. Light spontaneously emitted by the excimer laser gas immediately stably oscillates in the optical resonator, and stable outgoing light can be obtained from the continuous oscillation excimer laser with high response characteristics.

Another operation for turning on/off the use of outgoing light from the continuous oscillation excimer laser will be explained below.

Figure 28:
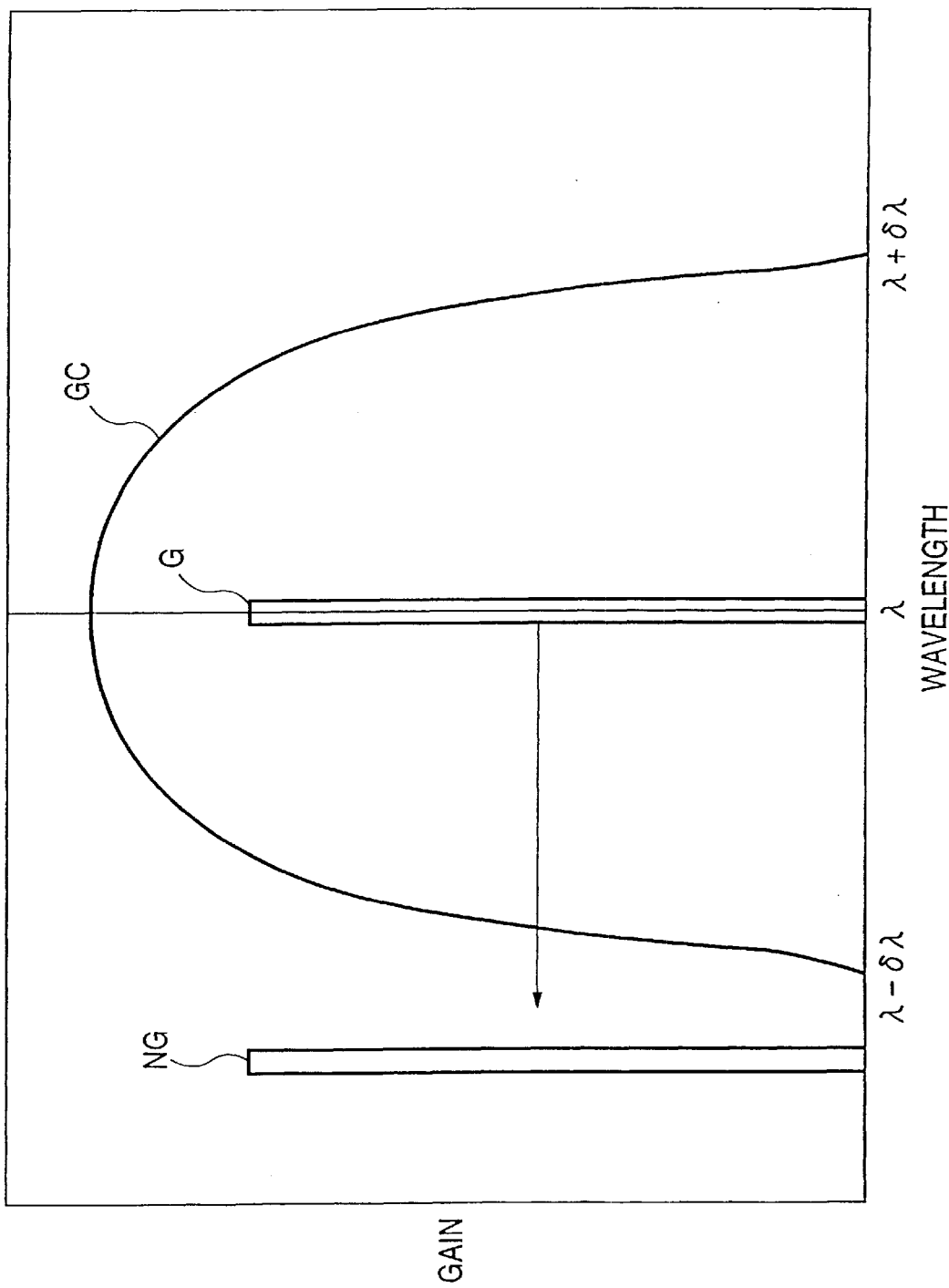
FIG. 28 is a graph showing a gain curve in the excimer laser according to the embodiment of the present invention.

When outgoing light from the continuous oscillation excimer laser is cut off, the control system 110 pivots the diffraction grating 106-2 while continuously supplying microwaves. With this operation, light in the predetermined wavelength region selected by the diffraction grating is changed, and only light in the changed wavelength region returns to the laser chamber 101 via the magnifying prism 106-1. At this time, since the changed wavelength region is difference from the wavelength in the oscillation region determined by the type of excimer laser gas, the returned light does not cause induced excitation emission by the excited excimer laser gas. Hence, light ceases to oscillate, and the outgoing light from the continuous oscillation excimer laser can be immediately cut off. This phenomenon will be described below with reference to FIG. 28.

Normally, the gain of the excimer laser with respect to the wavelength is determined depending on the type of gas. This relationship is represented by gain curve GC in FIG. 28. At this time, when light (G) in a wavelength region ($\lambda-\delta\lambda$ to λ+δλ) with a gain enters the excited excimer laser gas, it undergoes induced excitation emission, and the excimer laser oscillates. On the other hand, when light in a region (NG) different from the wavelength region (λ−δλ to λ+δλ) with a gain enters the excited excimer laser gas, it does not effect induced excitation emission, and the excimer laser does not oscillate. This embodiment utilizes this phenomenon, and when outgoing light of the continuous oscillation excimer laser is to be cut off, the diffraction grating 106-2 selects light in a region different from the wavelength region (λ−δλ to λ+δλ) with a gain as light that returns to the laser chamber.

At this time, although the excimer laser does not oscillate but outputs spontaneously emitted light, most of the light is cut off by the spatial filter 107 since it has no directivity.

When outgoing light from the continuous oscillation excimer laser is used again, the control system 110 pivots the diffraction grating 106-2 while continuously supplying microwaves. In this case, the diffraction grating selects the wavelength in the oscillation region, and only light in the selected region returns to the laser chamber 101 via the magnifying prism 106-1. The returned light immediately produces induced excitation emission by the excited excimer laser gas, and oscillates in the optical resonator. In this manner, stable outgoing light can be obtained from the continuous oscillation excimer laser with high response characteristics.

Figure 29:
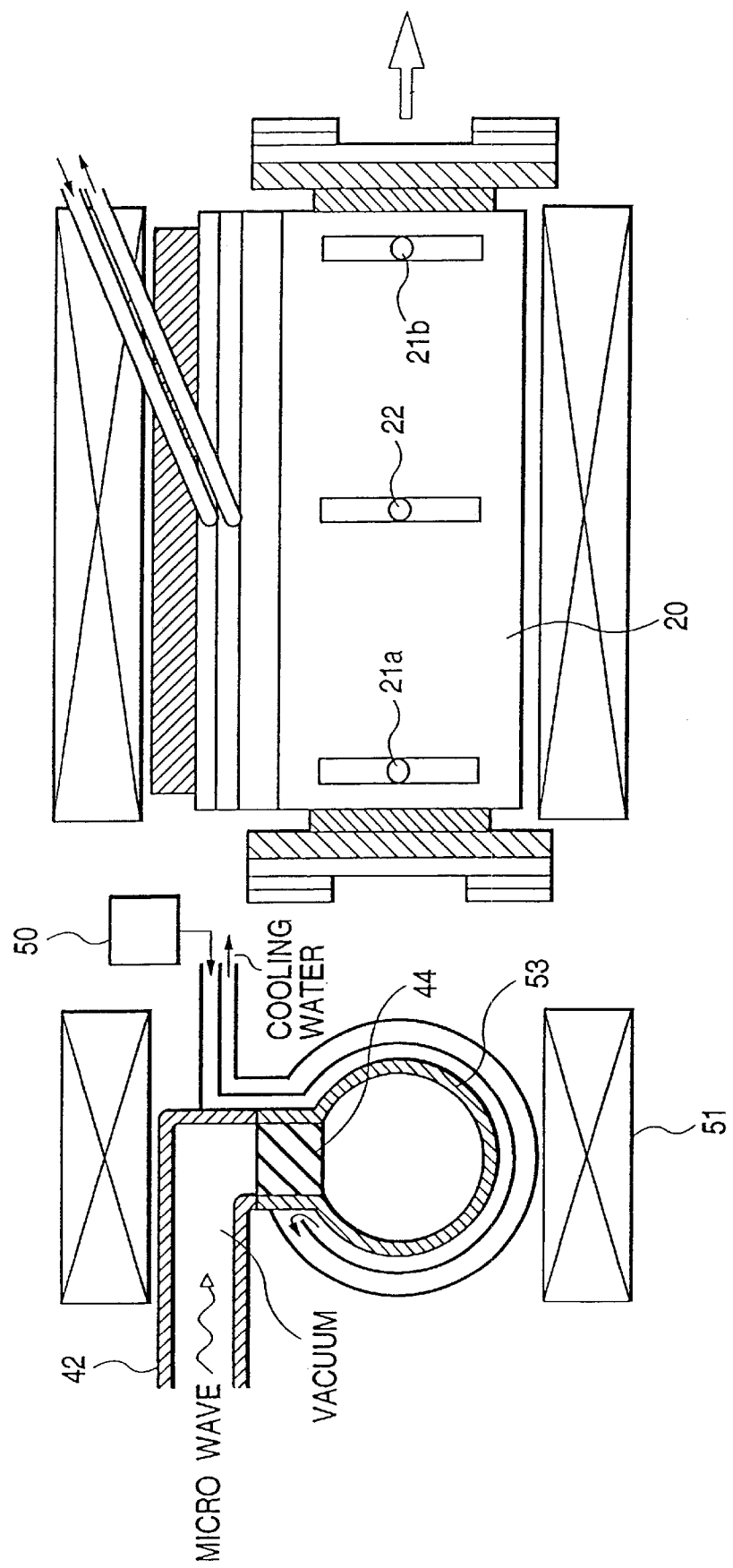
FIG. 29 shows a side view and a front view of an excimer laser oscillation apparatus according to an embodiment.

FIG. 29 shows the continuous emission excimer laser apparatus used in this embodiment.

In this embodiment, a cylindrical resonator was used as an optical resonator.

A reflection-free film was formed on the inner surface of the optical resonator. The uppermost surface of the resonator consisted of a fluoride.

A jacket-like cooling device was arranged on the outer surface of the resonator. The uppermost surface of the cooling device was covered by a heat insulating member, and a means for controlling the temperature of incoming cooling water to be lower than the ambient temperature and to nearly match the temperature of outgoing cooling wafer was arranged. With this means, temperature drifts of the optical resonator could be minimized.

As a waveguide, the waveguide (5-mm high, 10-cm wide oversize waveguide) shown in FIGS. 12A and 12B was used, and its interior was evacuated to $10^{-4}$ Torr level.

On the other hand, in this embodiment as well, a magnetic field was formed by magnets to attain stable plasma excitation.

An insulating plate 44 was formed with a multilayered coat reflection-free film consisting of $CaF_2$ and $MgF_2$ on the resonator side. A fluoride film was formed on the uppermost surface of the insulating plate.

Microwaves were generated by a gyrotron (tradename), and the supply frequency was set at 35 GHz. The gas composition was $Kr/Ne/F_2$ (3%:92%:5%).

The pressure was set at the atmospheric pressure. Hence, $\omega c = 4.5\omega$, and electrons collide 4.5 times during one cycle of the excitation frequency.

ωc: collision angular frequency of photons

In this embodiment, furthermore, as shown in FIG. 29, gas inlet ports 21a and 21b were formed on both end sides of a laser chamber (laser tube) 20, and a gas outlet port 22 was formed at the central portion of the chamber 20. With these ports, the supplied laser flowed toward the center. This is to also protect the surface of a light reflection plate on the output end, as described above. More specifically, since the uppermost surface of the light reflection plate is coated with, e.g., a thin fluoride film, it never reacts with $F_2$ and $F^*$. (Note that 42: a waveguide, 44: an insulating plate, 50: a temperature controller, 51: magnets, and 53: a laser tube.)

The reflectance of the light reflection plate was set at 99% or higher.

In this embodiment, the magnets 51 were arranged to apply a DC magnetic field in a direction nearly perpendicular to the microwave electric field, thus very stably starting and maintaining discharge.

An optical oscillator consisted of a metal cylinder having an inner diameter of several mm to several cm. The inner surface of the metal cylinder was coated with a reflection-free multilayered film. A fluoride film was formed on the uppermost surface of the metal cylinder.

Figure 30:
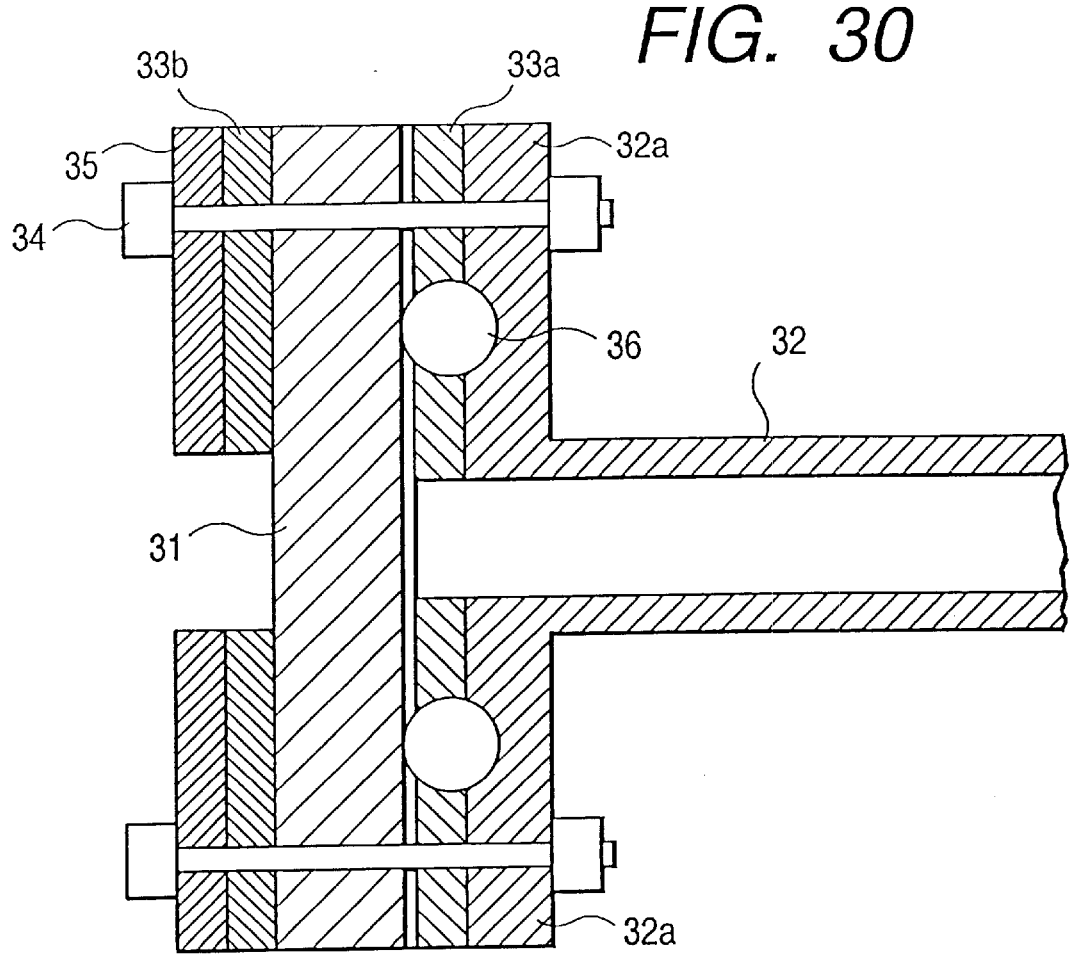
FIG. 30 is a sectional view showing the seal structure between a light reflection plate and a laser tube (metal cylinder) in the excimer laser oscillation apparatus according to the embodiment.
Figure 31:
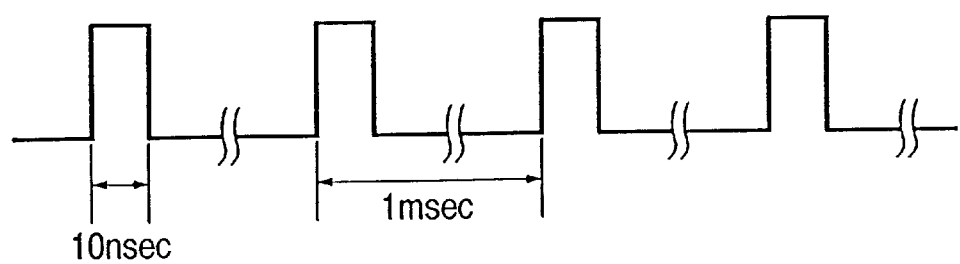
FIG. 31 is a schematic view showing a pulse state.
Figure 32:
FIG. 32 is a schematic view showing a real pulse state.

Sealed bonding between a light reflection plate 31 and the laser tube (a metal cylinder 32 in this embodiment) that made up the laser chamber was attained, as shown in FIG. 30.

More specifically, the reflection plate and the metal cylinder were in press-contact with each other by fastening bolts 34 while interposing a teflon plate ring 33a between the light reflection plate 31 and a flange 32a of the metal cylinder 32, and interposing a teflon plate ring 33b and a metal plate ring 35 between the bolts and the outer surface of the light reflection plate 31. Note that a seal was provided by an O-ring 36. Of course, they may be attached by screws using a bearing in place of the bolts 34.

Upon executing light emission by the above-mentioned arrangement, continuous emission having a sufficiently high output was achieved.

When a stepper was built using the continuous emission excimer laser oscillation apparatus, the arrangement was simplified and the service life of the lens material and the like was improved.

(Another Embodiment)

When losses in the resonator were extremely eliminated using the apparatus shown in FIGS. 21A and 21B to 23A and 23B, a stably, continuously emitted excimer laser beam could be obtained.

For example, the laser gas pressure was set at 65 Torr to suppress energy losses caused by the gas to 1%. In addition, a stable resonator was constructed by setting the reflectance of one reflection mirror at 100% and that of the output-side reflection mirror at 99.5% or higher. With this arrangement, the gain required for laser oscillation could be set at 2% or higher (reciprocal), and was larger than losses.

When microwave energy of 35 GHz is used and the pressure in the laser tube is set at 60 Torr, since losses-by the gas slightly increase, the reflectance of the output-side reflection mirror is preferably set at 99.9% or higher.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna, wherein the slots of the slot-antenna are arranged at intervals equal to the wavelength of microwaves.

2. An excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna, wherein the slots of the slot-antenna are oriented in a direction perpendicular to an axis of said microwave introduction means.

3. An excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna, wherein the slots of the slot-antenna are tilted 45° from an axis of said microwave introduction means.

4. An excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna, wherein pairs of orthogonal slots of the slot-antenna are tilted 45° from an axis of said microwave introduction means.

5. An excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna, wherein the slots of the slot-antenna are oriented in a direction parallel to an axis of said microwave introduction means.

6. An excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna, wherein the slots of the slot-antenna are arranged on a short end face of said microwave introduction means.

7. A laser oscillation method comprising the steps of:

storing a laser gas comprising at least one inert gas selected from the group consisting of Kr, Ar, Ne and $F_2$ gas; and introducing in-phase microwaves to the stored laser gas through slots of a slot-antenna.

8. A laser oscillation method comprising the steps of:

storing a laser gas comprising at least one inert gas selected from the group consisting of Kr, Ar, Ne and $F_2$ gas; and introducing in-phase microwaves to the stored laser gas.

9. A method according to claim 7, wherein the laser is an excimer laser.

10. A method according to claim 8, wherein the laser is an excimer laser.

11. An exposure apparatus comprising:

(A) an excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna;

(B) an illumination optical system for illuminating a patterned reticle with light output from said excimer laser apparatus;

(C) an imaging optical system for imaging light coming from the reticle onto a wafer; and (D) a movable stage on which the wafer is disposed and which carries the wafer, wherein the slots of the slot-antenna are arranged at intervals equal to the wavelength of microwaves.

12. An exposure apparatus comprising:

(A) an excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna;

(B) an illumination optical system for illuminating a patterned reticle with light output from said excimer laser apparatus;

(C) an imaging optical system for imaging light coming from the reticle onto a wafer; and (D) a movable stage on which the wafer is disposed and which carries the wafer, wherein the slots of the slot-antenna are oriented in a direction perpendicular to an axis of said microwave introduction means.

13. An exposure apparatus comprising:

(A) an excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna;

(B) an illumination optical system for illuminating a patterned reticle with light output from said excimer laser apparatus;

(C) an imaging optical system for imaging light coming from the reticle onto a wafer; and (D) a movable stage on which the wafer is disposed and which carries the wafer, wherein the slots of the slot-antenna are tilted 45° from an axis of said microwave introduction means.

14. An exposure apparatus comprising:

(A) an excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna;

(B) an illumination optical system for illuminating a patterned reticle with light output from said excimer laser apparatus;

(C) an imaging optical system for imaging light coming from the reticle onto a wafer; and (D) a movable stage on which the wafer is disposed and which carries the wafer, wherein pairs of orthogonal slots of the slot-antenna are tilted 45° from an axis of said microwave introduction means.

15. An exposure apparatus comprising:

(A) an excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna;

(B) an illumination optical system for illuminating a patterned reticle with light output from said excimer laser apparatus;

(C) an imaging optical system for imaging light coming from the reticle onto a wafer; and (D) a movable stage on which the wafer is disposed and which carries the wafer, wherein the slots of the slot-antenna are oriented in a direction parallel to an axis of said microwave introduction means.

16. An exposure apparatus comprising:

(A) an excimer laser apparatus comprising:

laser gas storage means which stores a laser gas comprising at least one inert gas selected from the group consisting of Kr, Ar, Ne and $F_2$ gas; and microwave introduction means having a slot-antenna for introducing in-phase microwaves to the laser gas through slots of the slot-antenna;

(B) an illumination optical system for illuminating a patterned reticle with light output from said excimer laser apparatus;

(C) an imaging optical system for imaging light coming from the reticle onto a wafer; and (D) a movable stage on which the wafer is disposed and which carries the wafer, wherein the slots of the slot-antenna are arranged on a short end face of said microwave introduction means.

* * * * *

UNITED STATES PATENT AND TRADEMARK OFFICE
CERTIFICATE OF CORRECTION

PATENT NO. : 6,603,786 B1
DATED : August 5, 2003
INVENTOR(S) : Tadahiro Ohmi et al.

It is certified that error appears in the above-identified patent and that said Letters Patent is hereby corrected as shown below:

Column 4,
Line 27, "an An" should read -- an --; and
Line 29, "having," should read -- having: --.

Column 5,
Line 26, "formals" should read -- formulas --.

Column 6,
Line 30, "embodiment; and" should read -- embodiment; --;
Line 34, "embodiment." should read -- embodiment; --; and
Line 35, "state." should read -- state; and --.

Column 8,
Line 10, "suffices" should read -- suffices for --.

Column 10,
Line 55, "the.insulating" should read -- the insulating --.

Column 11,
Line 64, "5 x 10$^{-3}$ cm$^{-3}$" should read -- 5 x 10$^{13}$ cm$^{-3}$ --.

Column 18,
Line 13, "wafer" should read -- water --.

Column 19,
Line 41, "Deep" should read -- deep --.

Column 20,
Line 57, "difference" should read -- different --.

Column 21,
Line 40, "wafer" should read -- water --.

UNITED STATES PATENT AND TRADEMARK OFFICE
CERTIFICATE OF CORRECTION

PATENT NO. : 6,603,786 B1
DATED : August 5, 2003
INVENTOR(S) : Tadahiro Ohmi et al.

It is certified that error appears in the above-identified patent and that said Letters Patent is hereby corrected as shown below:

Column 22,
Line 48, "losses-by" should read -- losses by --.

Signed and Sealed this

Sixteenth Day of March, 2004

JON W. DUDAS
*Acting Director of the United States Patent and Trademark Office*